(12) United States Patent
Jandhyala et al.

(10) Patent No.: US 12,435,259 B2
(45) Date of Patent: Oct. 7, 2025

(54) METHOD TO DESIGN CEMENT SLURRY WITH MINIMAL CARBON FOOTPRINT

(71) Applicant: Halliburton Energy Services, Inc., Houston, TX (US)

(72) Inventors: Siva Rama Krishna Jandhyala, Spring, TX (US); John Paul Bir Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1106 days.

(21) Appl. No.: 17/387,630

(22) Filed: Jul. 28, 2021

(65) Prior Publication Data

US 2023/0037091 A1 Feb. 2, 2023

(51) Int. Cl.
| | |
|---|---|
| *C09K 8/46* | (2006.01) |
| *C04B 14/04* | (2006.01) |
| *C04B 28/04* | (2006.01) |
| *E21B 33/13* | (2006.01) |

(52) U.S. Cl.
CPC .............. *C09K 8/46* (2013.01); *C04B 14/04* (2013.01); *C04B 28/04* (2013.01); *E21B 33/13* (2013.01)

(58) Field of Classification Search
None
See application file for complete search history.

(56) References Cited

U.S. PATENT DOCUMENTS

| | | |
|---|---|---|
| 2007/0184394 A1 | 8/2007 | Comrie |
| 2015/0321953 A1* | 11/2015 | Porcherie .............. C04B 28/04 106/713 |
| 2017/0364607 A1 | 12/2017 | Kaushik et al. |
| 2021/0150104 A1 | 5/2021 | Singh et al. |
| 2021/0172280 A1 | 6/2021 | Singh et al. |
| 2023/0185979 A1* | 6/2023 | Benkley ................ E21B 33/14 703/1 |
| 2023/0193720 A1* | 6/2023 | Amini .................... C09K 8/46 166/285 |
| 2023/0400449 A1* | 12/2023 | Jandhyala ............ G01N 33/383 |
| 2024/0295542 A1* | 9/2024 | Lende ................... E21B 47/005 |

FOREIGN PATENT DOCUMENTS

| | | |
|---|---|---|
| CN | 108009670 | 5/2018 |
| CN | 107391790 | 8/2020 |
| CN | 111582809 | 8/2020 |
| JP | 2001-039751 | 2/2001 |

OTHER PUBLICATIONS

International Search Report and Written Opinion for Application No. PCT/US2021/044508, dated Apr. 25, 2022.
U.S. Appl. No. 16/923,718, filed Jul. 8, 2020.
U.S. Appl. No. 16/923,752, filed Jul. 8, 2020.
U.S. Appl. No. 16/923,797, filed Jul. 8, 2020.
European Patent Office Extended European Search Report for EP Application No. 21952091.3 dated May 7, 2025. PDF file. 16 pages.

* cited by examiner

*Primary Examiner* — John J Figueroa
(74) *Attorney, Agent, or Firm* — Thomas Rooney; C. Tumey Law Group PLLC

(57) ABSTRACT

A method of producing a cement composition with reduced carbon emissions may include: defining cement constraints comprising at least one cement property; calculating a set of cement compositions which satisfy the cement constraints, using cement property models corresponding to the cement constraints; calculating a carbon emission associated with each of the cement compositions in the set of cement compositions using a carbon footprint model; selecting a cement composition from the set of cement compositions; and preparing the cement composition.

21 Claims, 4 Drawing Sheets

METHOD TO DESIGN CEMENT SLURRY WITH MINIMAL CARBON FOOTPRINT

BACKGROUND

In well cementing, such as well construction and remedial cementing, cement compositions are commonly utilized. Cement slurries may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement slurry may be pumped into an annulus between the walls of the well bore and the exterior surface of the pipe string disposed therein. The cement slurry may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement slurries also may be used in remedial cementing methods, for example, to seal cracks or holes in pipe strings or cement sheaths, to seal highly permeable formation zones or fractures, to place a cement plug, and the like.

A particular challenge in well cementing may be the development of satisfactory cement properties such as thickening time, fluid loss, and compressive strength, for example. These and other conventional cement property constraints generally define the cement composition by placing constraints on the type and amount of cementitious components, including additives, which may be included in the cement composition. There is increasing concern among end users of cement compositions regarding the environmental impact of cement with a particular focus on the carbon dioxide generated by cement production. Manufacturing of portland cement accounts for more than 5% of the global carbon emissions.

Some end users in the oilfield industry and construction industry may be bound by regulatory frameworks which designate an allowable amount of carbon emissions for a project. End users of cement may track overall carbon emissions for a project which may allow for compliance with regulatory or customer demands, for example. In the oilfield industry there may be carbon emissions associated with drilling, cementing, fracturing, and completing a wellbore which contribute to the overall carbon emissions associated with constructing an oilwell capable of producing hydrocarbons.

There are solutions available to reduce the carbon emissions associated with drilling, logging, fracturing, completions, and other wellbore operations which may involve using more efficient equipment or switching to alternative methods to power equipment such as natural gas, for example. However, cementing may be difficult to decarbonize as the carbon emissions associated with cementing are directly related to the material composition of the cement which are selected to meet the required properties of the cement.

Thus, there is a challenge to develop cementing methods which produce cement which may perform as an effective barrier to isolate and support a wellbore while also reducing the carbon emissions associated with the production of the cement.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
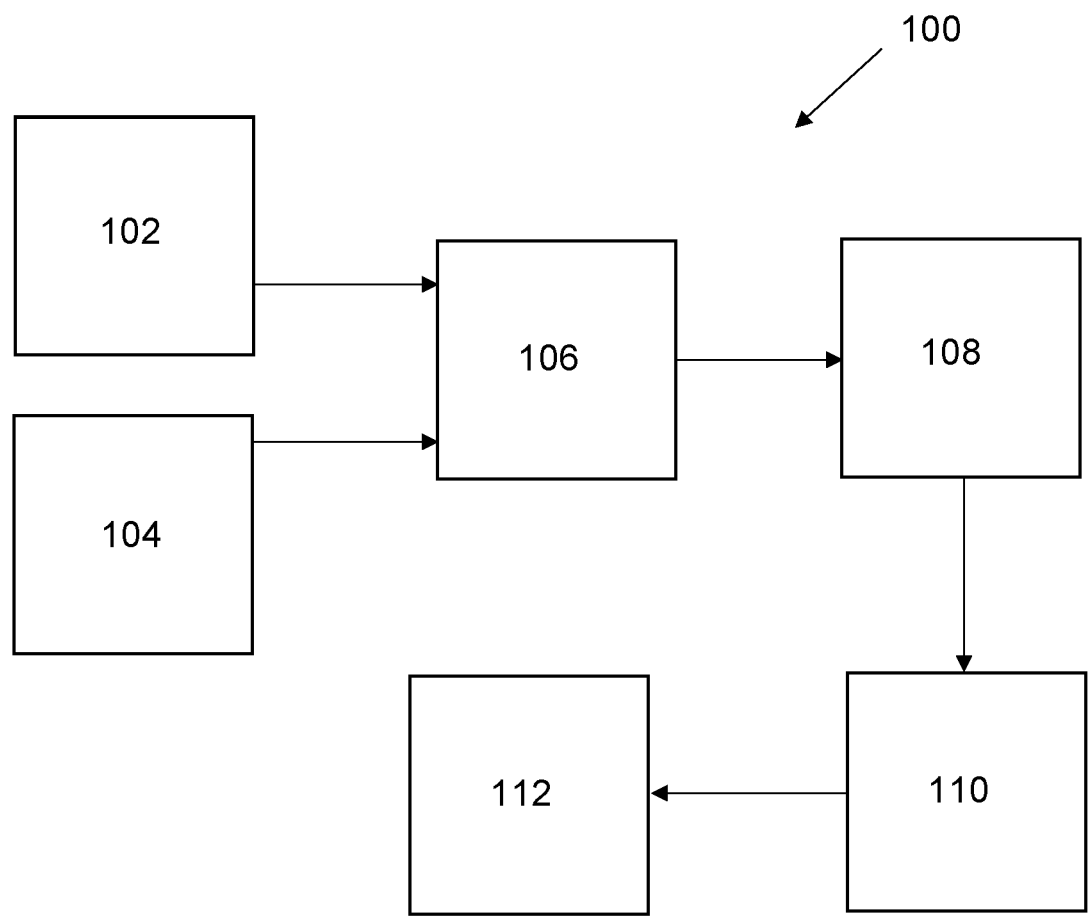
FIG. 1 is a flow diagram of a process for producing a cement composition with minimized carbon dioxide footprint.

The present disclosure may generally relate to cementing methods and systems. More particularly, embodiments may be directed to designing cement slurries utilizing a carbon model.

As discussed above, a cement composition for use in wellbore and construction applications must meet certain properties to be considered suitable for use. The cement properties such as compressive strength development, thickening time, fluid loss, mixability, stability, rheology, static gel strength, and mechanical properties, are dependent upon from the chemical identity and concentration of components in the cement composition. Discussed herein are cement property models which describe the relationship between cement composition and the cement properties. These cement property models may be utilized with the cement constraints which comprise the required cement properties to calculate cement composition which meet the cement constraints. The cement property models are not limited to those disclosed herein and may have many alternative forms. For example, the models may be described by an explicit mathematical relationship or in implicit form. Further, the models may be described by machine learning models, decision trees, neural net, or deep neural net, for example. Another model presented herein is a carbon footprint model which may be utilized to calculate the carbon emissions associated with the cement.

In the solution space of all possible cement compositions that are possible to create, there may only be a finite number or feasible set of cement compositions which satisfy the cement constraints to produce a cement with the required properties. Cement property models may be utilized with the cement constraints to determine the feasible set of cement compositions which satisfy the required cement properties. As used herein, cement composition is understood to mean all the components and concentrations thereof which make up a cement composition which may include cement such as hydraulic cement, additives such as dispersants, supplementary cementitious components such as pozzolans, and water, for example. Cement components is understood to mean all of the components of the cement composition, including those which may not have cementitious properties such as water and dispersants as well as those which have cementitious properties such as hydraulic cement and supplementary cementitious materials such as pozzolans. Once the feasible set of cement compositions is determined, the feasible set may be utilized with the carbon footprint model to calculate the resulting carbon emissions from each of the cement compositions within the feasible set. The feasible set may be ranked according to the calculated carbon emissions and a cement composition may be selected based on the ranking of calculated carbon emissions. The selected cement composition may be prepared and tested to ensure conformance to the cement property constraints.

Oftentimes the availability of cement components such as hydraulic cements, additives, and supplementary cementitious components varies by geographical location where the cement is being prepared. Further, the chemical composition of available cement components may vary by geographical location due to differences in production methods and conditions for materials such as Portland cement and from natural variations between mined materials such as pozzolans. Thus, a cement composition produced at one geographical location may have different properties from an identically prepared cement at a disparate geographical location due to differences in mineralogy and concentrations of minerals in the cement components. The methods disclosed herein may allow for producing a cement composition which minimizes carbon emissions from available cement components while still meeting the constraints set forth by the required cement properties even when the cement compositions are prepared at different geographical locations.

Physiochemical characterization techniques may be used to generate physicochemical data for the cement components available at a geographic location. Physicochemical characterization techniques tests may include, without limitation, determining the concentration and identity of minerals such as oxides present in the cement components, measuring surface area, measuring particle size, and measuring density, for example, among other physicochemical properties. Measuring physicochemical properties of each cement components may include many laboratory techniques and procedures including, but not limited to, microscopy, spectroscopy, x-ray diffraction, x-ray fluorescence, particle size analysis, water requirement analysis, scanning electron microscopy, energy-dispersive X-ray spectroscopy, surface area, specific gravity analysis, thermogravimetric analysis, morphology analysis, infrared spectroscopy, ultraviolet-visible spectroscopy, mass spectroscopy, secondary ion mass spectrometry, electron energy mass spectrometry, dispersive x-ray spectroscopy, auger electron spectroscopy, inductively coupled plasma analysis, thermal ionization mass spectroscopy, glow discharge mass spectroscopy x-ray photoelectron spectroscopy, mechanical property testing, Young's Modulus testing, rheological properties, Poisson's Ratio. One or more of the proceeding tests may be consider API tests, as set forth in the API recommended practice for testing well cements (published as ANSI/API recommended practice 10B-2 version 2013).

FIG. 1 is a flow chart illustrating a process 100 for producing a cement composition with minimized carbon dioxide footprint. Process 100 may begin with block 102 where the available cement components may be tallied for the geographical location. Physicochemical data for each cement component may also be provided in block 102 which may include any of the physicochemical properties described above and a carbon emission associated with the cement component. In block 104, cement constraints may be defined for cement properties including, but not limited to, compressive strength development, thickening time, fluid loss, mixability, stability, rheology, static gel strength, Young's modulus, and induction time, for example. Cement constraints are be any physical or chemical property that a cement slurry has or that a set cement has. The output from block 102 and block 104 may be used as input to block 106.

In block 106, cement property models corresponding to the cement constraints may be utilized with the cement constraints from block 104 to determine the feasible set of cement compositions which satisfy the required cement properties. For example, a thickening time model and compressive strength model may be utilized if a cement constraint defined in block 104 is thickening time and compressive strength. There may be a plurality of cement constraints each corresponding to a cement property model that may be utilized in cascading iterative succession to search for a cement composition which satisfies the cement constraints. An iterative method may be utilized to select cement components and concentrations thereof to form a test cement composition where the cement components correspond to the available cement components from block 102. Further constraints may be defined to limit the scope of search such as minimum or maximum content of one or more cement components. For a low-portland type cement, a constraint may include the requirement of less than 50% by weight portland cement in the cement composition, for example. Other constraints may include eliminating a cement component entirely such that the test cement composition does not contain the eliminated cement component. The test cement composition may then be used as input to the cement property model to calculate a calculated cement property. The calculated cement property may then be compared to the corresponding cement constraint to determine if the generated cement composition meets the cement constraint. If the calculated cement property does not meet or exceed cement constraint, a new test cement may be iteratively generated, and the calculated cement property may then be compared to the corresponding cement constraint to determine if the generated cement composition meets the cement constraint. If the test cement meets or exceeds the cement constraint, the test cement may be considered a solution (which may be expressed as a vector) to the cement constraint. In this manner the composition space containing solution vectors of cement compositions which satisfy a first cement constraint from the space of cement constraint defined in block 104 may be determined.

The composition space which satisfies the solution to the first cement constraint may then be utilized as an input to a second cement property model corresponding to a second cement constraint. Solution vectors from the composition space, each corresponding to a unique test cement composition, may then be used as input to the second cement property model to calculate a second cement property to determine if the cement composition meets or exceeds the cement constraint. If the cement composition does not meet or exceed the cement constraint, then the solution vector corresponding to the cement composition may be discarded from the solution space. The solution space may be narrowed successively for each cement constraint. In this manner, the solution space may be narrowed to a feasible set of cement compositions which can simultaneously satisfy all cement constraints.

The feasible set of cement compositions generated in block 106 may be used as an input to block 108. In block 108, a carbon footprint model may be utilized to calculate a carbon emission value associated with each of the compositions in the feasible set of cement compositions. The feasible set of cement compositions may then be ranked according to the carbon emission value to determine which cement compositions from the feasible set of cement compositions has the lowest carbon value per unit of cement.

The ranked list of feasible set of cement compositions may then be used as an input to block 110. In block 110, a user may select a cement composition from the feasible set of cement compositions, for example, the cement composition which has the lowest carbon value per unit of cement, to be prepared for testing. The cement composition may be prepared according to standard cementing practices as outlined in as set forth in the API recommended practice for testing well cements (published as ANSI/API recommended practice 10B-2 version 2013). The cement composition may be subjected to various tests, in accordance with API RP 10-B2, corresponding to the cement constraint from block 104 to verify that the selected cement composition has the properties required. If the cement composition meets each of the cement constraints in laboratory testing, the cement composition may be selected to be utilized in a cementing application such as construction or wellbore cementing. While carbon emissions and cement properties may be a determining factor is the cement composition meets the cement constraints, there may be other non-property related constraints which may determine suitability of a cement composition. For example, material availability may be a factor in determining if a particular feasible cement composition may be utilized for a particular cementing application. Another consideration may be cost per unit of cement.

From block 110, the selected cement composition may be utilized in block 112. In block 112, the selected cement composition may be prepared at scale, for example in a cement bulk plant, for use in a cementing application. The cement composition may be prepared by mixing a dry blend produced at a bulk plant with water and composition may be placed in a location requiring cementing and allowed to set to form a hardened mass.

Carbon emissions associated with a cement component may be quantified by measuring or modeling the production or mining process of the cement component, for example. The term "carbon footprint model" of a When modeling is used to quantify the carbon emission. Table 1 lists carbon dioxide emissions associated with some materials typically used in cement compositions. The quantity of greenhouse gas may vary based in part on the geographic source of the material and may be quantified for each cement material available in a geographic area.

TABLE 1

| Material | Product GHG [CO$_2$ Kg/tonne] |
|---|---|
| Portland | 950 |
| Fly Ash | 8 |
| Silicalite | 14 |
| Geo Polymer | 30 |
| Cement Kiln Dust | 0 |
| Crystalline Silica | 5.1 |
| Gypsum | 130 |
| CaCO3 | 32 |
| Lime | 780 |

For unit mass of powder in slurry ($m_{powder}=1$ gm), the amount of water is defined by equation 1 below.

$$m_{water} = \frac{\frac{\rho_{slurry}}{\rho_{powder}} - 1}{1 - \frac{\rho_{slurry}}{\rho_{water}}} gms \quad \text{Equation 1}$$

The volume of slurry per unit mass of powder defined by equation 2 below.

$$V_{slurry} = \frac{m_{powder}}{\rho_{powder}} + \frac{m_{water}}{\rho_{water}} CC \quad \text{Equation 2}$$

A carbon footprint model may then be expressed as in equation 3 below.

$$\text{carbon footprint} = \frac{\sum_i x_i \times CO2_i}{V_{slurry}} gm/CC \quad \text{Equation 3}$$

Where, $x_i$ is mass fraction of material i in powder and $CO2_i$ is the emission due to material i in gm/gm.

The carbon emissions due to a material may be determined by a cradle to grave lifecycle analysis of the material. Cradle to grave includes emissions related to production, transportation, storage, usage and disposal stages of a material. Total emissions associated with a material is the sum of emissions in each phase. Emissions may be expressed as kilograms of equivalent $CO_2$ per unit mass (or volume) of the material. There are several standards for computing the carbon emissions of a material. For example, the United States Environmental Protection Agency (EPA) publishes standards listed in the EPA's Waste Reduction Model (WARM) which allows for calculation of the carbon emissions of a material. Another source of standard is the California Air Resources Board's greenhouse gas quantification methodology.

To minimize carbon emissions associated with the cement composition, the objective function to be minimized is carbon footprint per barrel of cement composition. As discussed above, cement constraints may be defined which limit the feasible set of cement compositions which may be considered. Some cement constraints may include thickening time, fluid loss, unconfined compressive strength, and mixability, for example.

Thus, to minimize carbon emissions associated with the cement composition the objective may be expressed as equation 4, $$\min_i \frac{\sum_i x_i \times CO2_i}{V_{slurry}} \quad \text{Equation 4}$$

and the constraints may be expressed as equation 5.

$$\text{Cons}(TT_{upper} \leq TT \leq TT_{lower}, FL \leq FL_{upper}, UCA \geq UCA_{lower}, \text{Mix} \geq \text{Mix}_{lower}) \quad \text{Equation 5}$$

As discussed above, cement property models may be utilized to calculate the feasible set of cement compositions which satisfy the cement constraints. Some exemplary cement property models may include thickening time, fluid loss, compressive strength, and mixability, for example.

A first cement property model may include a thickening time model. Cement compositions are typically blended with chemical additives such as accelerators, retarders, fluid loss control additives, lost circulation control additives, rheological modifiers, and other chemical additives to impart desirable properties on the cement slurry such as fluid loss control, rheology, stability, and thickening time. The additive package that can satisfy all of these properties is typically determined through an iterative process. This is because one additive used to satisfy one property may affect another property. For example, a fluid loss control additive may retard the cement slurry. Thus, when designing for thickening time, the effects of each additive on thickening time must be accounted for.

At a given temperature, a thickening time model may include two main components, a component that models thickening time of the blend of cementitious components along with inerts, and a component that models thickening time of cement additives. Equation 6 is a general model equation for thickening time where TT is the thickening time which is a function of $TT_b$, which is a component that models thickening time of the blend of cementitious components, and of $TT_a$ which is a component that models thickening time of cement additives.

$$TT = f(TT_a, TT_b) \quad \text{Equation 6}$$

A thickening time model of the blend of cementitious components may account for pressure, temperature, ramp rate, density, and chemical composition of a cement slurry. The models thickening time of the blend of cementitious components may include two main components, the first being effects of water on thickening time and the second being effects of composition on thickening time. The first component is generally a function of the density of the cement slurry which may be controlled by varying the amount the amount of water that is added to a dry cement blend to produce the cement slurry. Further the type or source of water may affect the thickening time as dissolved ions in the water may interact with the cement components and additives. For example, a cement composition prepared with sea water may be expected to have a different thickening time than a cement composition prepared with fresh water. The second component is generally a function of the chemical identity of the components that make up the cement slurry and their corresponding mass or volume fractions in the cement slurry.

A relationship between water and thickening time may be expressed as a power law function as in equations 7 and 8. Equation 7 shows that the thickening time is proportional to the amount of water used in the preparing of the cement slurry. In equation 7, water/blend is a mass or volume ratio of water to the other components in the cement slurry such as Portland cement, supplementary cementitious materials and inert materials, and n is a measurement of sensitivity to change in water of the blend where n may be a constant or a function of the blend materials. In some instances, n may also be a function of the type of water. To determine n, two cement slurries at different densities may be mixed and the thickening time may be analyzed using laboratory methods. Thereafter, equation 7 or 8 may be used to calculate the value of n for the water. Equation 8 shows an alternate form of the relationship between water and thickening time as a function f comprising a polynomial. Other forms of function f may be log, exponential, power law, trigonometric, integral, differential, or combinations thereof.

$$TT \alpha \left(\frac{water}{blend}\right)^n \quad \text{Equation 7}$$

$$TT \alpha f\left(\frac{water}{blend} + \left(\frac{water}{blend}\right)^2 + ...\right) \quad \text{Equation 8}$$

A relationship between the effects of water on thickening time may be an exponential relationship as shown in equation 9. While only two forms for the effect of water on thickening time are described herein, the effect of water on thickening time may be expressed in any suitable manner such as a logarithmic model, integral model, derivative model, or any other suitable model.

$$TT \alpha e^{\left(n \frac{water}{blend}\right)} \quad \text{Equation 9}$$

A relationship describing effects of composition on thickening time may be a linear combination of individual contributions from each cement component as shown in equation 10. In equation 10, $x_i$ and $x_j$ are the mass fraction of component i and j, respectively, in the cement blend and $\beta_{1i}$, $\beta_{1ij}$, $\beta_{2i}$, etc are model parameters which characterize reactivity of component i and j, or interaction between component i and j. For some components, $\beta$ may be constant, whereas for other components $\beta$ may be depended upon temperature and pressure, for example. $\beta$ for any component may be experimentally determined. One method of obtaining $\beta_i$ for a cement component may be to select a Portland cement with a known or measured thickening time measured at a reference temperature, pressure, and density. Thereafter a volume of the cement component whose $\beta_i$ is unknown may be mixed with the selected Portland cement and water to the reference density. A thickening time test may be performed at the reference temperature and pressure and equation 4 may be used to determine the $\beta_i$ value for the cement component.

$$TT \alpha \Sigma_i x_i \beta_{1i} + \Sigma_i x_i x_j \beta_{1ij} + \Sigma_i x_i^2 \beta_{2i} ... \quad \text{Equation 10}$$

An alternate form of a relationship describing effects of composition on thickening time may be an exponential relationship as shown in equation 11.

$$TT \alpha e^{\Sigma_i x_i \beta_{1i} + \Sigma_i \Sigma_j x_i x_j \beta_{1ij} + \Sigma_i x_i^2 \beta_{2i}} ... \quad \text{Equation 11}$$

Another form of a relationship describing the effects of composition on thickening time may be integrated with the effects of water as shown in equation 12.

$$TT \alpha \left(\frac{water}{\sum_i x_i \beta_{1i} + \sum_i \sum_j x_i x_j \beta_{1ij} + \sum_i x_i^2 \beta_{2i} ...}\right)^n \quad \text{Equation 12}$$

A relationship describing effect of inert materials on thickening time may be a linear combination of volume fractions of different orders, as described in Equation 13.

$$TT \alpha \left[V_0\left(\frac{V_{inerts}}{V_{solids}}\right) + V_1\left(\frac{V_{inerts}}{V_{solids}}\right)^2 + ....\right] \quad \text{Equation 13}$$

In equation 13, $V_{inerts}$ is the volume of inert materials the blend, $V_{solids}$ is the volume of all the particulate materials including cementitious materials, supplementary cementitious materials, additives, and inert materials. $V_0$ and $V_1$ are model parameters which are dependent upon the physical and or chemical identity of the inert material. Inert materials may be any materials which do not participate in cementitious reactions such as, without limitation, weighting materials and loss circulation materials, for example. Another relationship of inert materials on thickening time may be linear combination of mass fractions of different orders as shown in equation 14.

$$TT \alpha \left[M_0\left(\frac{M_{inerts}}{M_{solids}}\right) + M_1\left(\frac{M_{inerts}}{M_{solids}}\right)^2 + ....\right] \quad \text{Equation 14}$$

In equation 14, $M_{inerts}$ is the mass of inert materials the blend, $M_{solids}$ is the mass of all the particulate materials including cementitious materials, supplementary cementitious materials, additives, and inert materials. $M_0$ and $M_1$ are model parameters which are dependent upon the physical and chemical identity of the inert material. Using equations 10-14 a number of models of thickening time of the blend ($TT_b$) may be derived. A generalized thickening time model of the blend is illustrated in equation 15. In equation 15, $TT_0$ is a thickening time of a Portland cement at a reference temperature, pressure, and mass fraction of water in the cement slurry. In general, the mass fraction of water to cement for $TT_0$ is taken to be 1:1. The correction factor in equation 15 is a function of effects of water on thickening time and the effects of composition on thickening time and the effects of inert materials. In the simplest case where a cement slurry is prepared using only Portland cement and water, equation 16 may be used to model the thickening time. In equation 16, n is a measurement of sensitivity to change in water of the Portland cement where n may be a constant or a function of the mass ratio Portland cement in the cement slurry. The constant n may be determined by mixing slurries at different water to Portland ratios and measuring the change in thickening time using a consistometer.

$$TT_b = TT_0 \times Correctrion\ Factor \qquad \text{Equation 15}$$

$$TT_b = TT_0 \left(\frac{water}{portland}\right)^n \qquad \text{Equation 16}$$

In a more typical case where a cement slurry is prepared with Portland cement, supplementary cementitious materials, and inert materials, equation 17 may be used to model the thickening time.

$$TT_b = TT_0 \left(\frac{water}{blend}\right)^n \times \left(\sum_i x_i \beta_i\right) \qquad \text{Equation 17}$$

If there are interactions between the components of the cement slurry, equation 18 may be used to model the thickening time.

$$TT_b = TT_0 \left(\frac{water}{blend}\right)^n \times \left(\left(\sum_i x_i \beta_i\right) + \left(\sum_i \sum_j x_i x_j \beta_{ij}\right) + ...\right) \qquad \text{Equation 18}$$

In the thickening time models above $\beta_i$ and $\beta_{ij}$ are model parameters which characterize reactivity of component i and j, or interaction between component i and j. For some components, $\beta$ may be constant, whereas for other components $\beta$ may be depended upon temperature and pressure, for example. $\beta$ for any component may be experimentally determined. One method of obtaining $\beta_i$ for a cement component may be to select a Portland cement with a known or measured $TT_0$ where $TT_0$ is measured at a reference temperature, pressure, and density. Thereafter a volume of the cement component whose $\beta_i$ is unknown may be mixed with the selected Portland cement and water to the reference density. A thickening time test may be performed at the reference temperature and pressure and any of equations 9-11 may be used to determine the $\beta_i$ value for the cement component.

An alternate form of a relationship describing effects of composition and additives on thickening time may be a relationship as shown in equation 19 where $TT_b$ is contribution of thickening time of blend which may be a function of the bulk bend composition, mass fraction of water in the cement slurry, as well as temperature and pressure. In examples where the bulk blend composition is pure cement without additional supplemental cementitious materials, or inert materials, then $TT_b$ is the contribution of compressive strength from the cement alone. $TT_a$ is contribution of thickening time of additives which may be a function of mass fraction of additives as well as temperature and pressure.

$$TT \alpha TT_b * TT_a \qquad \text{Equation 19}$$

A thickening time model of cement additives ($TT_a$) may account for whether the additive has a tendency to accelerate or retard the cement hydration or both, whether the effect of the additive on thickening time is temperature dependent, whether are interactions between additives, and interactions between additives and the cement blend materials. A generalized relationship between the effects of additives on thickening time is shown in equation 20 where $f_c$ is a function and C is a concentration of an additive. In some examples, $f_c$ may comprise a polynomial, log, exponential, power law, trigonometric, integral, differential, or combinations thereof A thickening time model with additives and blend is shown in equation 21.

$$TT_a \alpha f_c(C) \qquad \text{Equation 20}$$

$$TT = TT_b f_c(C) \qquad \text{Equation 21}$$

One form of $f_c$ may be expressed as an exponential as in equation 22. In equation 22, $\gamma$ is a measure of potency of an additive to accelerate or retard the cement hydration process and c is the concentration of the additive, typically expressed with reference to a base material such as cement such as by weight of cement (bwoc), or as a mass fraction or volume fraction. The potency of the additive $\gamma$, is typically a function of temperature, pressure as well as the concentration of the additive. For an additive that retards, $\gamma$ will be positive and for an additive that accelerates $\gamma$ will be negative.

$$TT_a \alpha e^{\gamma c} \qquad \text{Equation 22}$$

A relationship between the effects of additives on thickening time may be expressed as power law as in equation 23. In equation 23, c is the concentration of the additive and a is a constant where a is positive for retarders and a is negative for accelerators.

$$TT_a \alpha (C)^a \qquad \text{Equation 23}$$

A relationship between the effects of additives on thickening time may be expressed as an exponential in equation 24 and 25. In equations 24 and 25, T is temperature, E is activation energy, c is the concentration of the additive, and $\gamma_0$ is a potency at a reference temperature. The activation energy E captures the effect of temperature on additive. In equation 26, the term S(T) is a sigmoid function with temperature and equation 26 is one form of a sigmoid function and equation 27 shows one form of a sigmoid function.

$$TT_a \alpha e^{\left(\gamma_0 + \frac{E}{T}\right) \times C} \qquad \text{Equation 24}$$

$$TT_a \alpha e^{(\gamma_0 + ET) \times C} \qquad \text{Equation 25}$$

$$TT_a \alpha e^{(\gamma_0 + \gamma_1 * S(T)) \times C} \qquad \text{Equation 26}$$

$$S(T) = \frac{1}{1 + e^{(T-T_0) \times \lambda}} \qquad \text{Equation 27}$$

A relationship between the effects of additives on thickening time may be expressed as polynomial as in equation 28. In equation 28, C is the concentration of the additive and a and b are polynomial coefficients.

$$TT_a \alpha aC + bC^2 + \ldots \qquad \text{Equation 28}$$

A relationship between the effects of additives on thickening time may be expressed as polynomial as in equation 29. In equation 29, $\gamma_0$ is a potency below a threshold temperature beyond which the additive can undergo changes in orientation, shape, dissolution kinetics, dissociation tendency etc. and thus increase/decrease its potency as a function of temperature, $E_1$ and $E_2$ are polynomial coefficients, C is the concentration of the additive, and T is temperature.

$$TT_a \alpha e^{(\gamma_0 + E_1 T + E_2 T^2 + \ldots) \times C} \qquad \text{Equation 29}$$

A relationship between the additives and thickening time may be expressed as a function of concentration of additives as in equation 30.

$$TT_a \propto e^{(\gamma_0 + \gamma_1 * S(C)) \times c} \qquad \text{Equation 30}$$

In Equation 30, S(C) may be a sigmoid function in concentration and C is concentration of additive expressed as by weight of water.

A relationship between the additives potency and concentration may be expressed as equation 31.

$$\gamma_{eff} = \gamma_0 + \frac{\gamma_1}{1 + e^{(C-C_0) \times \lambda}} \qquad \text{Equation 31}$$

In equation 31, $\lambda$ is a measure of how rapidly the potency changes due to changes in concentration. $C_0$ is the threshold concentration around which the potency changes. $\gamma_0$ and $\gamma_1$ determine the limits for potency.

When two or more additives are used together in the same cement slurry, there may be interactions between the additives. A relationship between the effects of additives on thickening time with interactions may be expressed as in equation 32. In equation 32, $\gamma_1$ is potency of the first additive, $c_1$ is the concentration of the first additive, $\gamma_2$ is potency of the second additive, $c_2$ is the concentration of the second additive, and $\gamma_{int}$ is potency of the interaction.

$$TT_a \alpha e^{\gamma_1 C_1} \times e^{\gamma_2 C_2} \times e^{\gamma_{int} \frac{C_1}{C_1 + C_2}} \qquad \text{Equation 32}$$

Another form of a relationship between the effects of additives on thickening time with interactions may be expressed as in equation 33.

$$TT_a \alpha e^{\gamma_1 C_1} \times e^{\gamma_2 C_2} \times e^{\gamma_{int} C_1 C_2} \times \ldots \qquad \text{Equation 33}$$

Using any of the above equations for $TT_b$, or any other thickening time model of blend $TT_b$, and any equations the above equations for $TT_a$ a number of models of thickening time (TT) may be derived. Some forms of the thickening time model may be described by equation 34-37.

$$TT = TT_b \times e^{\gamma c} \qquad \text{Equation 34}$$

$$TT = TT_b \times e^{\left(\gamma_0 - \gamma_1 * \frac{1}{1 + e^{(T-T_0) \times \lambda}}\right) \times C}$$

$$TT = TT_b \times e^{\gamma_1 C_1} \times e^{\gamma_2 C_2} \times e^{\gamma_{inc} C_1 C_2}$$

$$TT = TT_b \times e^{\gamma_1 \sigma(c) * g(T) * P(P))} \times e^{\gamma_2 C_2}$$

The previous discussion of thickening time assumed a constant temperature. The following discussion will be directed to thickening time accounting for variable temperature. At a given temperature, a thickening time model may include two main components, a component that models thickening time of the blend of cementitious thickening time of a cement slurry may be written as a mathematical function of various factors as shown in equation 38.

$$TT = f(T_{dh}, P_{dh}, \rho_s, C_{bl}, [A]) \qquad \text{Equation 38}$$

Where TT is the thickening time, $T_{dh}$ is a downhole temperature profile of the wellbore, $P_{dh}$ is a pressure in the wellbore, $\rho_s$ is density of the cement slurry, $C_{bl}$ is the composition of the cement slurry, and [A] is a concentration of the additive such as retarder/accelerator required.

The model of equation 38 may be generalized to account for different temperature-time behaviors as shown in equation 39.

$$1 = \int_0^\tau \frac{dt}{TT(T_{dh}(t), P_{dh}(t), \rho_S(t), C_{bl}(t), [A](t))} \qquad \text{Equation 39}$$

Where thickening time is a function of time (t), $T_{dh}(t)$ is a temperature downhole as a function of time, $P_{dh}(t)$ is a pressure in the wellbore as a function of time, $\rho_s(t)$ is density of the cement slurry as a function of time, $C_{bl}(t)$ is the composition of the cement slurry as a function of time, and [A](t) is a concentration of the retarder/accelerator required as a function of time. The thickening time of the cement slurry may be found as a solution to the integral equation. Equation 31 allows evaluation of effect of time-dependent temperature on thickening time.

Equation 31 may be further generalized by assuming that density and composition, including additives, of the cement slurry remains constant over time which produces equation 40.

$$1 = \int_0^\tau \frac{dt}{TT(T_{dh}(t), P_{dh}(t))} \qquad \text{Equation 40}$$

As mentioned above, thickening time may be dependent upon temperature. A relationship between temperature and thickening time may be described by the activation energy of the materials included in the cement slurry. This relationship may be generalized as shown in equation 41.

$$TT = TT_0 \exp\left(\frac{-E}{R}\left(\frac{1}{T_{ref}} - \frac{1}{T}\right)\right) \qquad \text{Equation 41}$$

Where $TT_0$ is the characteristic thickening time of the cement blend at a reference temperature $T_{ref}$, E is the effective activation energy, R is the universal gas constant, and T is the downhole temperature. In some examples, T may be a function of time as T(t). $TT_0$ of the cement blend is the thickening time of a cement blend which includes cement, supplementary cementitious materials, if present, and additives, mixed with water to form a cement slurry at a reference density, and measured at a reference temperature.

The effective activation energy in Equation 44 may determine the sensitivity of the cement design to changes in temperature. For cements, E is a positive number indicating an increase in reaction rate as temperature is increased. A relatively larger value of E indicates a relatively higher sensitivity to changes in temperature. E is a material property which depends on the components of the cement slurry. A model of E is shown in equation 42, where $E_i(T)$ is the activation energy of the $i^{th}$ individual component of the dry blend as a function of temperature, $m_i$ is the mass, volume, or molar fraction of the $i^{th}$ individual component of the dry blend, w is the water content of the cement slurry on a per mass of dry blend basis, and $E_w$ is activation energy associated with the amount of water in the slurry. In some cement slurries the activation energy associated with a cement slurry may depend on the amount of water in the slurry. For example, the activation energy of a 14 ppg (pounds per gallon) (1677 kg/m$^3$) slurry may be different from a 12 ppg (1438 kg/m$^3$) slurry. One way to determine $E_w$ may be to determine activation energy of a 14 ppg (1677 kg/m$^3$) slurry and 12 ppg (1438 kg/m$^3$) slurry by measuring the thickening time of the two slurries at different temperatures. Thereafter, $E_w$ may be determined using Equation 42, if $E_L(T)$ are known for blend materials. In equation 43, the dry blend referenced includes all components of a cement slurry other than water, such as cement, supplementary cementitious additives, inert materials, and chemical additives. In some examples, the effective activation energy may have the form of Equation 43. In Equation 43, $E_1(T)$ is the activation energy of the $i^{th}$ individual component of the dry blend as a function of temperature, $m_i$ is the mass, volume, or molar fraction of the $i^{th}$ individual component of the dry blend, w is the water content of the cement slurry on a per mass of dry blend basis, and $E_w$ is a activation energy associated with water.

$$E = g(E_i(T), m_i, E_w(T), w) \quad \text{Equation 42}$$

$$E = \frac{\sum_i E(T)_i m_i + E_w(T)W}{\sum_i m_i + w} \quad \text{Equation 43}$$

In general, the activation energy of component i may be a function of temperature as shown in Equation 44. In equation 44, f may be any polynomial or transcendental function such as a power law, an exponential, logarithmic, trigonometric or any combination thereof. Equation 45 is one form of equation 44 with a polynomial function where $E_0$, $E_1$, $E_2$, etc are constants and T is temperature.

$$E_i = f(T) \quad \text{Equation 44}$$

$$E_i = E_0 + E_1 T + E_2 T^2 + \ldots \quad \text{Equation 45}$$

Some cement components may be relatively more sensitive to changes in temperature. Table 2 illustrates E/R values for selected cement components. Table 3 illustrates two cement compositions and table 4 illustrates thickening times of the cement compositions of table 3 as measured in a consistometer. It can be observed that the inclusion of CKD makes the cement composition more sensitive to changes in temperature.

TABLE 2

| Blend Material | Class/Category | E/R (J/Mol-K) |
|---|---|---|
| Portland Cement | Class H | 795 |
| Portland Cement | Class G | 1359 |
| Fly Ash | Class F | 1378 |
| Fly Ash | Class C | 1837 |

TABLE 2-continued

| Blend Material | Class/Category | E/R (J/Mol-K) |
|---|---|---|
| Volcanic Ash | N/A | 2316 |
| CKD | N/A | 5706 |

TABLE 3

| Material | Design 1 | Design 2 |
|---|---|---|
| Class H | 0.333 | 0.333 |
| Class C Fly Ash | 0.333 | 0.333 |
| Volcanic Ash | 0.334 | 0 |
| CKD | 0 | 0.334 |

TABLE 4

| Design # | Thickening Time @ 210° F. | Thickening Time @ 120° F. |
|---|---|---|
| 1 | 146 | 290 |
| 2 | 126 | 402 |

In this example, designs with CKD can be used across wells that vary in temperature, without the need for significantly changing additives. Alternately, designs with CKD can cause risk of excessive wait on cement or premature setting due to uncertainty in downhole temperatures. Knowledge of temperature sensitivity of materials can thus be used to efficiently design for any temperature.

Another cement property model may include a mixability model. Water requirement is defined as the minimum quantity of water required to hydrate a quantity of solid particulate material. A cement slurry including solid particulate materials and water therefore has a minimum amount of water per unit mass of the solid particulate materials at which the solid particulate materials and water can be blended together to form the cement slurry. As used herein, solid particulate material or particulate material means any component of a cement slurry that is not water. When the minimum amount of water is present, the cement slurry may be referred to as "mixable." Additionally, since dry components in the cement slurry are generally denser than water, a cement slurry that is blended with the minimum quantity of water per unit mass of dry components is usually the highest density at which the cement slurry can be prepared.

A cement slurry may be prepared with water that is in excess of the water requirement up to the point where the cement slurry becomes unstable, also referred to as the upper limit of stability. A cement slurry may become unstable when water is present in an amount that exceeds the maximum sorption capabilities of the dry components of the cement slurry. Unstable cement slurries may be characterized by phase separation of water from the bulk cement slurry. The upper limit of stability may also be the minimum stable density the cement slurry may be mixed to as water is generally less dense than dry components of the cement slurry.

The term mixability or alternatively, mixable, refers to the ability of the components comprising a cement slurry to blend to form the cement slurry and may be associated with the minimum water requirement of the dry components. The term stability or alternatively, stable, refers to the ability of the components comprising the cement slurry remain in a slurry once blended and may be associated with the upper limit of stability. The American Petroleum Institute (API)

publishes industry guideline standards for determining whether a cement slurry is mixable and stable. The API guidelines allow one of ordinary skill in the art to determine if a cement slurry is mixable and stable by performing standardized laboratory tests on the cement slurry.

In some mixability tests, the API recommends specifications and practices for mixing a specific volume of neat cement slurry (i.e. a slurry without dispersing or water extending additives) at certain speeds for certain periods of time to determine if a slurry is mixable. Additives may then be incorporated into the cement slurry and the cement slurry may be re-tested, for example. Some particular cement slurry tests to determine mixability may be found in API RP 10B version 2013. One of ordinary skill in the art would be able to perform a mixability test on a cement slurry and determine if the cement slurry is mixable according to API RP 10B. In some stability tests, the API recommends specifications and practices for mixing a specific volume of neat cement slurry (i.e. a slurry without dispersing or water extending additives) at certain speeds for certain periods of time and then placing the neat cement slurry in a container of specified volume. The cement slurry may be observed and a measure of water that phase separates may be measured. Some variants of the stability tests may include performing the tests at elevated temperatures or placing the container at specified angels. Additives may then be incorporated into the cement slurry and the cement slurry may be re-tested, for example. Some particular cement slurry tests to determine stability may be found in API RP 10B. One of ordinary skill in the art would be able to perform a mixability test or a stability test on a cement slurry and determine if the cement slurry is mixable and stable according to API RP 10B.

There may be various degrees of mixability such as, for example, unmixable, mixable, or partially mixable. An unmixable slurry may be a slurry where there is not enough water present to wet all components in the slurry. A mixable slurry may be a slurry where there not enough water present to wet all components in the slurry. A partially mixable slurry may be where only a portion of the components in the slurry are wetted. Mixability of a cement slurry may be a function of water requirement for each component of the cement slurry. Water requirement of each material may be defined as the amount of mixing water that is required to be added to a powdered, solid material to form a slurry of a specified consistency. The consistency may vary for a particular application. This water requirement of a material is an intrinsic property and may depend on various factors including, but not limited to particle size and distribution, shape, porosity, surface charge and specific gravity of the material. This water requirement of a material may be distinguished from the water requirement of a cement slurry which is purely the amount of water needed to be mixed with unit mass of cement to achieve a certain target slurry density. The following example technique for determining water requirement holds the consistency and amount of water constant while varying the amount of the solid material. However, techniques may also be applied that vary the amount of the water, the consistency, and/or the amount of solid material in any combination. The following technique also estimates the specified consistency based on the size of the vortex at the surface of the mixture in the blender. Water requirement for a particular cement component may be determined by a process that includes a) preparing a blender (e.g., Waring® blender) with a specified amount of water (e.g., about 100 grams to about 500 grams), b) agitating the water at a specified blender rpm (e.g., 4,000 to 15,000 rpm), c) adding the powdered solid that is being investigated to the water until a specified consistency is obtained, and d) calculating the water requirement based on the ratio of water to solids required to obtain the desired consistency. A specific example for determining water requirement may include, but is not limited to: 1) preparing a blender (e.g., Waring® blender) with a specified amount of water (e.g., about 100 grams to about 500 grams or about 200 grams in one example); 2) agitating the water at a specified blender rpm (e.g., about 4,000 to about 15,000 rpm or about 12,000 rpm in one example); 3) adding a specified amount (e.g., about 1 gram to about 1,000 grams or about 400 grams in one example) of the cement component to the water; 4) observing mixture to determine if a specified consistency is obtained, for example, the cement component can be considered thoroughly wet and mixed if the vortex formed at the surface of the mixture in the blender is about 0 inches (0 mm) to about 2 inch (50 mm) or about 0.004 inches (0.1 mm) to about 1 inch (25 mm); 5) if the desired consistency is not obtained, add more cement component until desired consistency is obtained, for example, the vortex formed in the blender is about the size of a dime; and 6) calculate the water requirement based on the ratio of water to cement component to obtain the desired consistency. In some examples, the specific consistency may be where a vortex at the surface of the mixture in the blender is the size of a dime or about 0.7 in (17.9 mm). Table 5 illustrates an example of water requirement for some samples expressed as a weight of water required.

Water requirement may be defined for any materials present in a cement slurry such as materials that dissolve as well as materials that do not dissolve. Some dissolvable materials may be solvated by water or by chemical reaction with water or other chemical species present in the slurry and thereafter be solvated. Some common dissolvable materials may include cementitious materials, fluid loss additives, polymers, gums, and other cement components that are well known in the art. Additionally, materials that do not dissolve, such as plastic beads for example, may also exhibit a water requirement. Water requirement may be positive water requirement or negative water requirement. In the instance of a positive water requirement, the particular material requires water to be present to hydrate. An example of a material with a positive water requirement is Portland class H cement. Pure Portland class H cement without additives requires addition of water to become a cement slurry capable of setting to form a hardened mass. Superplasticizers such as polycarboxylate ether dispersants may have a negative water requirement in that a polycarboxylate ether dispersant may reduce the water requirement that a Portland class H cement requires to become mixable.

TABLE 5

| Material Name | Water Requirement (%) |
|---|---|
| Natural Glass A | 60 |
| Natural Glass B | 58 |
| Pozzolan Mix | 28 |
| Natural Glass C | 59 |
| Hydrated Lime | 131 |
| Silicalite | 136 |
| Metakaolin | 101 |
| Portland Class H | 44 |

The water requirements in Table 5 are listed as the water requirement as a mass of water compared the mass of the material. For Portland Class H cement for example, 1 kg of cement may require 440 grams of water to be mixable by the definition of mixability previously defined. As illustrated in Table 5, water requirement may vary between materials that have the same chemical identity. For example, Natural Glass A has a water requirement of 60% by weight, while Natural Glass B has a water requirement of 58% by weight. The difference in water requirements may be caused by many factors including minerology and origin of the material. For a given dry cement composition, the minimum water requirement, or water required to wet all particulate materials, may be calculated by a linear combination of the mass fraction of each component and the water requirement of each component in the dry cement composition by Equation 46. Dry cement composition, particulate materials, dry blend may refer to the components of a cement slurry other than cement additives and water.

$$WR_{Blend} = \Sigma M_i WR_i \qquad \text{Equation 46}$$

where $WR_{Blend}$ is the minimum water requirement expressed as mass of water per unit mass of dry cement required to hydrate all particles of the dry blend. $M_i$ is the mass fraction or mass of component i in the cement composition and $WR_i$ is the water requirement of component i in the cement composition. $WR_{Blend}$ may also be expressed in units of volume by converting mass to volume by water density.

In some examples, there may be synergistic effects between the components of the cement composition when blended to a slurry. Some effects may reduce the water requirement of the blend while some effects may increase the water requirement of the blend. These synergistic mixing effects may be expressed by a non-linear equation such as Equation 47.

$$WR_{Blend} = Z(M_i WR_i)^{B_i} \qquad \text{Equation 47}$$

Where $WR_{Blend}$ is the total mass of water required per unit mass of the dry cement composition, $M_1$ is the mass fraction or mass of component i in the cement composition, WR is the water requirement of component i in the cement composition, and $B_i$ is a material constant for component i. The material constant may be a measured property that may be acquired by laboratory analysis. For example, water requirements of individual materials and combinations of materials may be measured. A curve fitting scheme such as multivariate analysis or stepwise regression, for example, may then be applied to find $B_i$. A previously discussed, water may be used to adjust the density of a cement slurry to meet the density requirements for a particular cementing application. For a given cement composition and density, the required amount of water to achieve the density may be readily calculated from Equation 48.

$$\rho\left(\frac{\text{mass}}{\text{vol}}\right) = \frac{(\text{mass of dry cement composition} + \text{mass of water})}{(\text{volume of dry cement composition} + \text{volume of water})} \qquad \text{Equation 48}$$

Where $\rho_{slurry}$ is the slurry density, $W_i$ mass of component i in the cement composition, $v_i$ is the specific volume of component i, $\rho_{H2O}$ is the density of water, and $WR_{slurry}$ is the mass of water required per unit mass of the particulate cement blend to achieve a target slurry density.

Alternatively, Equation 48 may be expressed based on a unit mass of the dry cement blend as follows:

$$\rho_{slurry} = \frac{1 + WRslurry}{\sum(1 * M_i v_i) + WRslurry} \qquad \text{Equation 49}$$

In Equation 49, all variables are known except the water requirement of the slurry ($WR_{slurry}$). In general, to have a cement slurry that is mixable, the minimum water requirement of the dry cement composition $WR_{Blend}$ calculated by Equation 46 or Equation 47 should be less than the water requirement of the slurry $WR_{Slurry}$ calculated from Equation 48. If this condition is not met, there is not enough water to wet the particles in the slurry and the slurry may not be mixable. As with $WR_{Blend}$, $WR_{Slurry}$ may be readily converted to volume through water density.

As discussed above, a cement slurry prepared with a water volume over the water volume requirement of the particular cement dry blend may lead to a layer of water, sometimes referred to as free water or free fluid, to form on the cement slurry. A cement slurry where a free water layer is formed may be referred to as an unstable slurry. Although the formation of a free fluid may generally be undesirable, each section of a wellbore to be cemented may have an acceptable amount of free fluid formation either defined by regulation, economics, or customer specification, for example. The maximum water requirement ($WR_{Max}$) is therefore typically provided as a design parameter that does not necessarily need to be calculated for the particular wellbore section to be cemented. For example, in a conductor casing or a surface casing cement, a relatively larger amount of free fluid may be allowed as compared to a horizontal casing cement. In some applications, no amount of free water may be present. The maximum water requirement may be on the order of about 2.5 to about 10 times the $WR_{Blend}$ in some applications.

The relationship between $WR_{Slurry}$, $WR_{Blend}$, and $WR_{Max}$ is illustrated in Equation 50. $WR_{Slurry}$ must fall between the minimum water requirement, $WR_{Blend}$, and the maximum water requirement, $WR_{Max}$, to form a slurry that is mixable and stable.

$$WR_{Blend} < WR_{Slurry} < WR_{Max} \qquad \text{Equation 50}$$

For a given dry cement composition $WR_{Blend}$, and $WR_{Max}$ a minimum stable slurry density and a maximum stable slurry density may be calculated from water requirement of materials in the dry cement composition.

$WR_{Blend}$, and $WR_{Max}$ may be calculated based on a unit mass of dry cement composition as in Equations 51 and 52.

$$\rho_{min} = \frac{1 + \rho_{H2O} WR_{Blend}}{\sum(1 * M_i v_i) + WR_{Blend}} \qquad \text{Equation 51}$$

$$\rho_{max} = \frac{1 + \rho_{H2O} WR_{Blend}}{\sum(1 * M_i v_i) + WR_{Max}} \qquad \text{Equation 52}$$

Once $WR_{Slurry}$, $WR_{Blend}$, and $WR_{Max}$ are calculated, $WR_{Slurry}$ may be compared to $WR_{Blend}$ and $WR_{Max}$ and to see if a dispersant, suspension additive, or free water additive may be included in the cement composition to form a mixable and/or stable slurry. If $WR_{Slurry}$ is less than $WR_{Blend}$, the slurry may not be mixable and a dispersant may be included in the slurry. If $WR_{Slurry}$ is greater than $WR_{Max}$, the slurry may be mixable but a free water layer may separate from the slurry. In alternate embodiments, if $WR_{Slurry}$ is less than $WR_{Blend}$, the cement slurry may be adjusted to include less of a component with a relatively higher water requirement thereby reducing $WR_{Blend}$. If $WR_{Slurry}$ is greater than $WR_{Max}$, the cement slurry may be adjusted to include more of a component with a relatively higher water requirement thereby increasing $WR_{Max}$. In alternate embodiments, $WR_{Slurry}$ may be compared to $WR_{Blend}$ and $WR_{Max}$ by fractional difference, difference between $WR_{Slurry}$, $WR_{Blend}$, and $WR_{Max}$, and/or absolute difference.

Another cement property model may be a cement compressive strength model. Compressive strength of a cement composition may be a function of a mass of water to mass of cementitious material ratio (w/c) as well as the chemical identity of cementitious components and concentration thereof in a cement composition. In general, two identical dry blend cements which are mixed with unequal amounts of water may exhibit different final compressive strengths. A cement slurry prepared with relatively more water or a higher w/c ratio may have a lower final compressive strength than a cement slurry prepared with relatively less water or a lower w/c ratio. The relationship between compressive strength and w/c ratio may be described by Abrams' law in equation 53. Alternatively, equation 53 may be rewritten in log form as in equation, for example. The constants A and B may vary depending on the identity of the cementitious material. Constants for fly ash may not be identical to constants associated with Portland cement. Furthermore, the constants A and B may also vary depending on the source of the cementitious material as individual manufacturer processes may result in variations in mineralogical makeup of cementitious materials. For natural or mined materials such as natural glasses, regional variability may result from different mines or natural source of the materials.

Equation 53 may be used to predict compressive strengths of Portland cement slurries as well as cements that do not comprise Portland cement. Equations 53 and 54 may also be used for cements such as pozzolanic cements, aluminate cements, geopolymer cements, and others. Equations 53 and 54 may also be used for blends of cementitious materials, such as Portland and a second cementitious material, where interaction between the constants A and B for Portland cement and the constants A and B for the second cementitious material may be calculated. The constants A and B may be calculated by preparing a plurality of cement slurries which contain varying concentrations of cementitious components. The cement slurries may be allowed to harden and a compressive strength measurement may be taken for each slurry. The results may then be correlated by fitting the compressive strength results for each tested slurry to either equation 53, 54, or any equivalents thereof to determine A and B.

$$CS = \frac{A}{B^{1.5*(\frac{w}{c})}} \quad \text{Equation 53}$$

$$\ln(CS) = \ln(A) - 1.5*\ln(B)*\frac{w}{c} \quad \text{Equation 54}$$

Power law behavior of water to cement ratios on compressive strength may be approximated by an exponential equation. Equation 55 is a model that may approximate the behavior of a cement slurry as a function of $CS_0$, w/c, and a constant n. Equation 55 may predict the ultimate compressive strength of the cement slurry. Alternatively, equation 55 may be rewritten as equation 56. $CS_0$ is the compressive strength obtained when water and cement are mixed in equal mass proportions (w/c=1) and n is function of various factors such as, including, but not limited to, time of cure, temperature of curing, slurry of dry cement blend, and other factors. From the results it can be observed that the value of n may be on the order of about −2.5 for various cementitious system. The cement in the water to cement ratio is any cementitious material such as fly ash, cement kiln dust, Portland cement, natural glass, and other cementitious materials that may be present in the cement slurry. The water to cement ratio w/c can also be calculated from slurry density ($\rho_s$), dry blend density ($\rho_D$), and water density ($\rho_w$) as shown in equation 57.

$$CS = CS_0\left(\frac{w}{c}\right)^n \quad \text{Equation 55}$$

$$\ln\left(\frac{CS}{CS_0}\right) = n*\ln\left(\frac{w}{c}\right) \quad \text{Equation 56}$$

$$\frac{w}{c} = \frac{1 - \frac{\rho_s}{\rho_D}}{\frac{\rho_s}{\rho_W} - 1} \quad \text{Equation 57}$$

The above equations may be combined to form equation 58 and equation 59. Equations 58 and 59 may be used to predict compressive strength for any known values of A and B.

$$\ln(CS) = \ln(A) - 1.5*\ln(B)*\frac{1 - \frac{\rho_s}{\rho_D}}{\frac{\rho_s}{\rho_W} - 1} \quad \text{Equation 58}$$

$$\ln\left(\frac{CS}{CS_0}\right) = n*\ln\left(\frac{1 - \frac{\rho_s}{\rho_D}}{\frac{\rho_s}{\rho_W} - 1}\right) \quad \text{Equation 59}$$

A generalized correlation for 7-day compressive strength, also known as the ultimate compressive strength, may be written as in question 60.

$$CS(7\text{-day})=f(WR, SG, \text{particle size, BET, SSA, } C_2S, C_3S, C_4AF, C_3A, CaSO_4, \text{gypsum}) \quad \text{Equation 60}$$

In equation 60, CS(7-day) is the 7 day compressive strength of the cement slurry, WR is the water requirement of the cement components in the cement slurry, SG is the specific gravity of the cement components in the cement slurry, particle size is the particle size of the cement components in the cement slurry, BET is the Brunauer-Emmett-Teller surface area of the cement components in the cement slurry, SSA is the specific surface area of the cement components in the cement slurry, $C_2S$ is the concentration of dicalcium silicate of the cement components in the cement slurry, $C_3S$ is the concentration of tricalcium silicate of the cement components in the cement slurry, $C_4AF$ is the concentration of tetra calcium aluminoferrite of the cement components in the cement slurry, $C_3A$ is the concentration of tricalcium aluminate of the cement components in the cement slurry, $CaSO_4$ is the concentration of calcium sulfate of the cement components in the cement slurry, and gypsum is the concentration of gypsum of the cement components in the cement slurry. Equation 60 may have many forms. In general, a form of equation 60 may be derived from testing a 7-day compressive strength of a plurality of cement slurries and fitting the compressive strength data to a curve using regression analysis. The curve may have any form such as linear, polynomial, exponential, derivative, or any other suitable curve.

Another cement property model may include a fluid loss model. The physicochemical properties in a fluid loss model may include, but are not limited to, number average molecular weight, weight average molecular weight, polydispersity index, radius of gyration Rg, wet time, rheology, degree of branching, number of carbon atoms, ratio of carbon atoms to sulfur, nitrogen, and/or oxygen, and/or fluid loss property. An example of correlating desirable properties with at least one physicochemical property will now be described for an example polymer. For a polymeric fluid loss control additive, the fluid loss performance may be correlated to the molecular weight of the polymer. However, as will be illustrated below, in addition to the number or mass average molecular weight, there is a contribution from the dispersity to the performance of the polymeric fluid loss control additive. Polymerization reactions typically generate a distribution of polymer sizes around an average value. As used herein, "polydispersity index" (PDI) refers to a measure of the distribution of molecular mass in a given polymer sample. The polydispersity index is calculated by dividing the weight average molecular weight (Mw) by the number average molecular weight (Mn). As used herein, the term "weight average molecular weight" generally refers to a molecular weight measurement that depends on the contributions of polymer molecules according to their sizes. As used herein, the term "number average molecular weight" generally refers to a molecular weight measurement that is calculated by dividing the total weight of all the polymer molecules in a sample with the total number of polymer molecules in the sample. These terms are well-known by those of ordinary skill in the art.

There may exist an optimum PDI at which fluid loss performance and mixability of a polymer are balanced such that fluid loss is minimized while mixability is maximized. Another factor which may contribute to the performance of a polymer may be the degree of branching of the polymer. The degree of branching may be measured in terms of the radius of gyration of a polymer molecule, wherein the larger radius of gyration for a given molecular weight equates to a lower degree of branching. As will be illustrated below, polymeric fluid loss control additive specifications that do not include PDI and radius of gyration may pass as a given product but may have vastly different performance characteristic.

A model may be used that incorporates the effects of PDI, Rg, concentration, and molecular weight. One form of the model may be expressed in Equation 61.

$$\ln(FL) = A + B*PDI + C*R_g + D[CONC] + E*Mw \qquad \text{Equation 61}$$

Another form of the model may be expressed in Equation 62.

$$FL = K*P(PDI)^\alpha * R(R_g)R^\beta * C([Conc])^\gamma * D(Mw)^\delta \qquad \text{Equation 62}$$

In either model from Equation 61 or Equation 62, the constants A, B, C, D, and E and α, β, γ, and δ may be determined by multivariate linear regression or any other regression technique. K, P, R, C and D represent functions. P(PDI) indicates a function of PDI. The functions may be exponential, logarithmic, trigonometric, polynomial, power law or combinations thereof.

The models presented above may be useful to characterize a polymer and may provide insight into polymer specifications that may affect polymer performance such as PDI and radius of gyration. The models may also be used to tune a polymer for a desired performance characteristic or to design a polymer to have a desired physicochemical property. For example, the models may be used to design a cement that has a desired wet time and/or fluid loss property. The models may be used to determine the number average number average, weight average, polydispersity index, and radius of gyration Rg that is required to achieve the desired wet time, rheology, degree of branching, number of carbon atoms, ratio of carbon atoms to sulfur, nitrogen, and/or oxygen, and/or fluid loss property. The models may be used to determine the required concentration of the polymer to include to achieve the desired fluid loss, for example.

Figure 2:
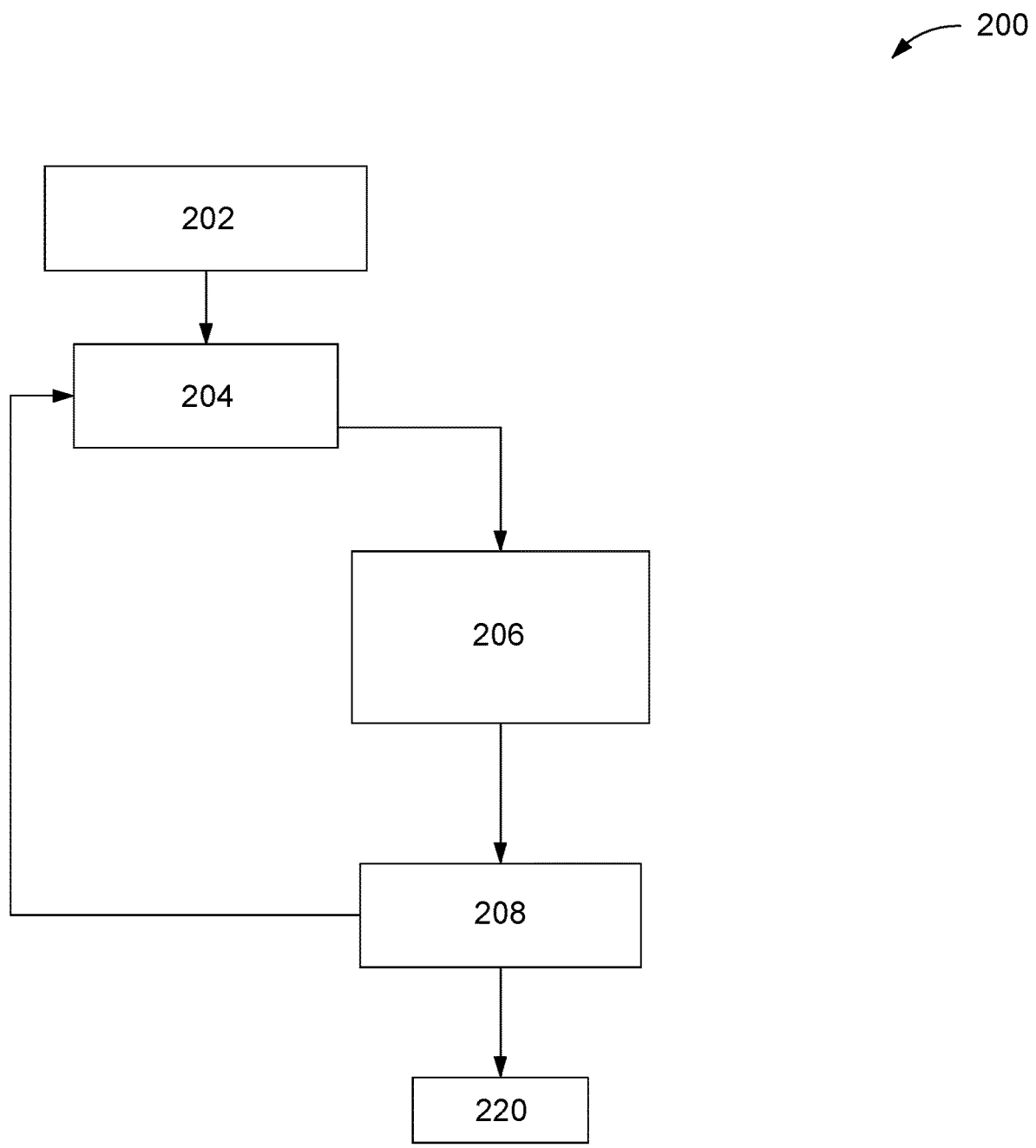
FIG. 2 is a flow diagram of a method of calculating a cement property.

FIG. 2 illustrates a method 200 corresponding to block 106 of FIG. 1. In block 106, cement property models corresponding to the cement constraints may be utilized with the cement constraints from block 104 to determine the feasible set of cement compositions which satisfy the required cement properties. For example, a thickening time model and compressive strength model may be utilized if a cement constraint defined in block 104 is thickening time and compressive strength. Method 200 may begin with step 202 where a cement property model is selected which corresponds to a cement constraint. The cement property model may correspond to any of the above-mentioned models. In step 204 a cement composition may be generated by selecting a cement and concentration thereof, a supplementary cementitious material and a concentration thereof, a water and concentration thereof, and one or more chemical additives and concentration thereof. In step 206, a cement property corresponding to the cement composition generated in step 204 and cement property model in step 202 may be calculated. In step 208, the calculated cement property from step 206 may be compared to a corresponding cement constraint defined in block 104. If the cement generated in step 204 meets or exceeds the cement constraint, the cement composition may be stored in a set of feasible compositions in step 220. If the cement generated in step 204 does not meet or exceed the cement constraint, the method may proceed back to step 204. In 204, the step of generating a cement composition may include selecting different concentrations and/or different chemical identities for the cement and/or supplementary cementitious materials and/or one or the more chemical additives than previously selected. Thereafter the process may be repeated for each cement composition of interest to at least partially define the feasible space of compositions which satisfy the cement property constraints. In some examples, the set of feasible compositions generated from step 220 may be used as input to a second or further cement property model such that the set of feasible compositions may be further reduced to those compositions which satisfy multiple cement properties simultaneously.

Figure 3:
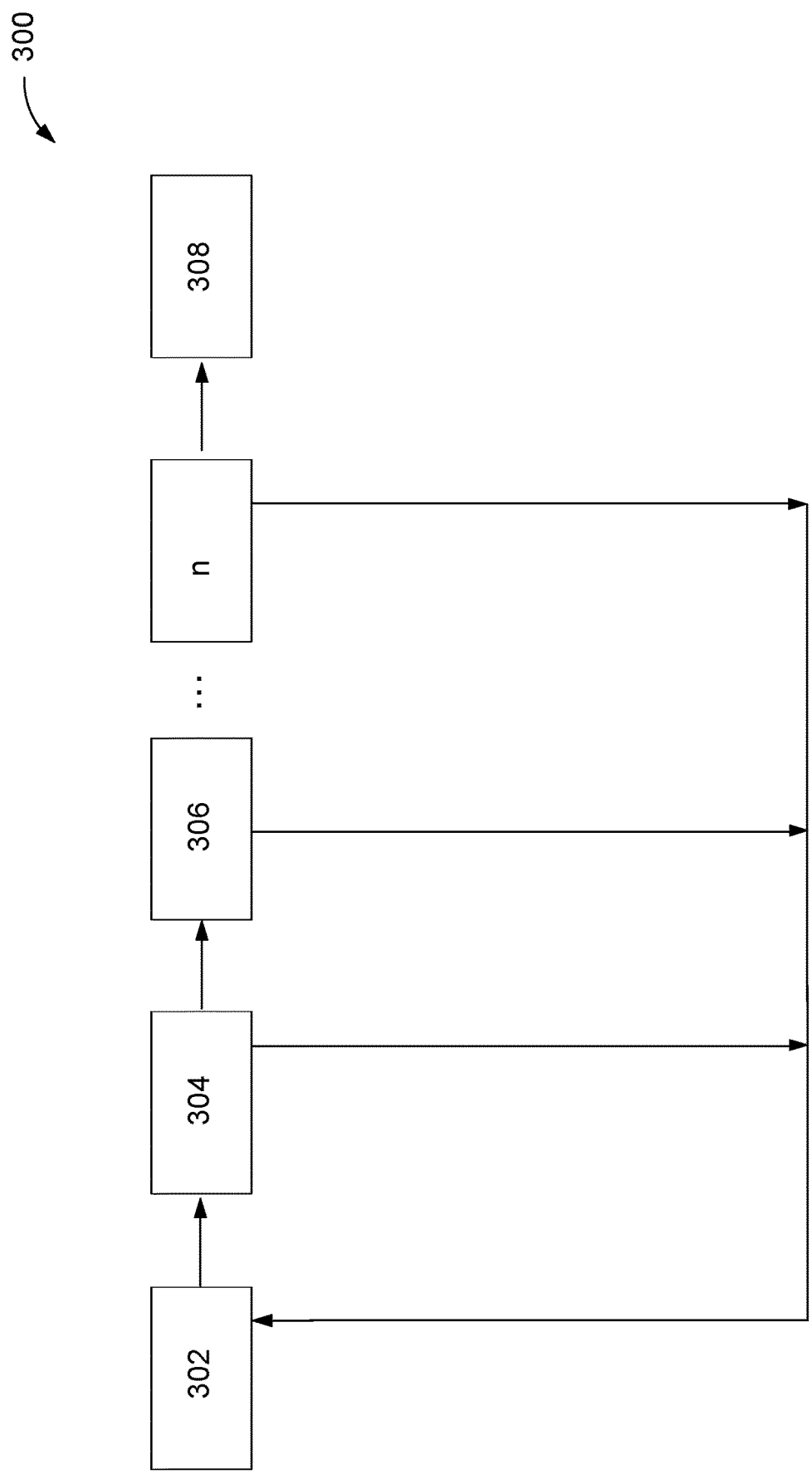
FIG. 3 is a flow diagram of a method of calculating a cement property.

FIG. 3 illustrates a method 300 corresponding to block 106 of FIG. 1. In block 106, cement property models corresponding to the cement constraints may be utilized with the cement constraints from block 104 to determine the feasible set of cement compositions which satisfy the required cement properties. For example, a thickening time model and compressive strength model may be utilized if a cement constraint defined in block 104 is thickening time and compressive strength. Method 300 may begin with step 302 where a cement composition may be generated by selecting a cement and concentration thereof, a supplementary cementitious material and a concentration thereof, a water and concentration thereof, and one or more chemical additives and concentration thereof. In step 304, a first cement property corresponding to a first cement constraint defined in block 104 may be calculated. The calculated property may be compared to the corresponding cement constraint. If the cement generated in step 302 meets or exceeds the first cement constraint, the composition may be passed to step 306. If the cement generated in step 302 does not meet or exceed the cement constraint, the method may proceed back to step 302. In the second or further iteration of step 302, the step of generating a cement composition may include selecting different concentrations and/or different chemical identities for the cement and/or supplementary cementitious materials and/or one or the more chemical additives than previously selected. In step 306 the cement from step 302 a second cement property corresponding to a second cement constraint defined in block 104 may be calculated. The calculated property in step 302 may be compared to the corresponding cement constraint. If the cement generated in step 302 does not meet or exceed the second cement property, the method may proceed back to step 302. In the second or further iteration of step 302, the step of generating a cement composition may include selecting different concentrations and/or different chemical identities for the cement and/or supplementary cementitious materials and/or one or the more chemical additives than previously selected. If the cement generated in step 302 meets or exceeds the second cement constraint, the composition may be passed to a third and subsequent block where the additional cement properties corresponding to the cement properties in block 104 may be calculated and compared. If the cement composition generated in step 302 meets or exceeds all the cement corresponding cement constraint defined in block 104, the cement composition generated in step 302 may be stored in a set of feasible compositions in step 308. Thereafter the process may be repeated for each cement composition of interest to at least partially define the feasible space of compositions which satisfy the cement property constraints.

Cement compositions described herein may generally include a hydraulic cement and water. A variety of hydraulic cements may be utilized in accordance with the present disclosure, including, but not limited to, those comprising calcium, aluminum, silicon, oxygen, iron, and/or sulfur, which set and harden by reaction with water. Suitable hydraulic cements may include, but are not limited to, Portland cements, pozzolana cements, gypsum cements, high alumina content cements, silica cements, and any combination thereof. In certain examples, the hydraulic cement may include a Portland cement. In some examples, the Portland cements may include Portland cements that are classified as Classes A, C, H, and G cements according to American Petroleum Institute, *API Specification for Materials and Testing for Well Cements*, API Specification 10, Fifth Ed., Jul. 1, 1990. In addition, hydraulic cements may include cements classified by American Society for Testing and Materials (ASTM) in C150 (Standard Specification for Portland Cement), C595 (Standard Specification for Blended Hydraulic Cement) or C1157 (Performance Specification for Hydraulic Cements) such as those cements classified as ASTM Type I, II, or III. The hydraulic cement may be included in the cement composition in any amount suitable for a particular composition. Without limitation, the hydraulic cement may be included in the cement compositions in an amount in the range of from about 10% to about 80% by weight of dry blend in the cement composition. For example, the hydraulic cement may be present in an amount ranging between any of and/or including any of about 10%, about 15%, about 20%, about 25%, about 30%, about 35%, about 40%, about 45%, about 50%, about 55%, about 60%, about 65%, about 70%, about 75%, or about 80% by weight of the cement compositions.

The water may be from any source provided that it does not contain an excess of compounds that may undesirably affect other components in the cement compositions. For example, a cement composition may include fresh water or saltwater. Saltwater generally may include one or more dissolved salts therein and may be saturated or unsaturated as desired for a particular application. Seawater or brines may be suitable for use in some examples. Further, the water may be present in an amount sufficient to form a pumpable slurry. In certain examples, the water may be present in the cement composition in an amount in the range of from about 33% to about 200% by weight of the cementitious materials. For example, the water cement may be present in an amount ranging between any of and/or including any of about 33%, about 50%, about 75%, about 100%, about 125%, about 150%, about 175%, or about 200% by weight of the cementitious materials. The cementitious materials referenced may include all components which contribute to the compressive strength of the cement composition such as the hydraulic cement and supplementary cementitious materials, for example.

As mentioned above, the cement composition may include supplementary cementitious materials. The supplementary cementitious material may be any material that contributes to the desired properties of the cement composition. Some supplementary cementitious materials may include, without limitation, fly ash, blast furnace slag, silica fume, pozzolans, kiln dust, and clays, for example.

The cement composition may include kiln dust as a supplementary cementitious material. "Kiln dust," as that term is used herein, refers to a solid material generated as a by-product of the heating of certain materials in kilns. The term "kiln dust" as used herein is intended to include kiln dust made as described herein and equivalent forms of kiln dust. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on a number of factors, including the particular kiln feed, the efficiencies of the cement production operation, and the associated dust collection systems. Cement kiln dust generally may include a variety of oxides, such as $SiO_2$, $Al_2O_3$, $Fe_2O_3$, $CaO$, $MgO$, $SO_3$, $Na_2O$, and $K_2O$. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, limestone, and/or dolomitic limestone and a variety of oxides, such as $SiO_2$, $Al_2O_3$, $Fe_2O_3$, $CaO$, $MgO$, $SO_3$, $Na_2O$, and $K_2O$, and other components, such as chlorides. A cement kiln dust may be added to the cement composition prior to, concurrently with, or after activation. Cement kiln dust may include a partially calcined kiln feed which is removed from the gas stream and collected in a dust collector during the manufacture of cement. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$. The CKD and/or lime kiln dust may be included in examples of the cement composition in an amount suitable for a particular application.

In some examples, the cement composition may further include one or more of slag, natural glass, shale, amorphous silica, or metakaolin as a supplementary cementitious material. Slag is generally a granulated, blast furnace by-product from the production of cast iron including the oxidized impurities found in iron ore. The cement may further include shale. A variety of shales may be suitable, including those including silicon, aluminum, calcium, and/or magnesium. Examples of suitable shales include vitrified shale and/or calcined shale. In some examples, the cement composition may further include amorphous silica as a supplementary cementitious material. Amorphous silica is a powder that may be included in embodiments to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process In some examples, the cement composition may further include a variety of fly ashes as a supplementary cementitious material which may include fly ash classified as Class C, Class F, or Class N fly ash according to American Petroleum Institute, API Specification for Materials and Testing for Well Cements, API Specification 10, Fifth Ed., Jul. 1, 1990. In some examples, the cement composition may further include zeolites as supplementary cementitious materials. Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite.

Where used, one or more of the aforementioned supplementary cementitious materials may be present in the cement composition. For example, without limitation, one or more supplementary cementitious materials may be present in an amount of about 0.1% to about 80% by weight of the cement composition. For example, the supplementary cementitious materials may be present in an amount ranging between any of and/or including any of about 0.10%, about 10%, about 20%, about 30%, about 40%, about 50%, about 60%, about 70%, or about 80% by weight of the cement.

In some examples, the cement composition may further include hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in examples of the cement composition, for example, to form a hydraulic composition with the supplementary cementitious components. For example, the hydrated lime may be included in a supplementary cementitious material-to-hydrated-lime weight ratio of about 10:1 to about 1:1 or 3:1 to about 5:1. Where present, the hydrated lime may be included in the set cement composition in an amount in the range of from about 10% to about 100% by weight of the cement composition, for example. In some examples, the hydrated lime may be present in an amount ranging between any of and/or including any of about 10%, about 20%, about 40%, about 60%, about 80%, or about 100% by weight of the cement composition. In some examples, the cementitious components present in the cement composition may consist essentially of one or more supplementary cementitious materials and the hydrated lime. For example, the cementitious components may primarily comprise the supplementary cementitious materials and the hydrated lime without any additional components (e.g., Portland cement, fly ash, slag cement) that hydraulically set in the presence of water.

Lime may be present in the cement composition in several; forms, including as calcium oxide and or calcium hydroxide or as a reaction product such as when Portland cement reacts with water. Alternatively, lime may be included in the cement composition by amount of silica in the cement composition. A cement composition may be designed to have a target lime to silica weight ratio. The target lime to silica ratio may be a molar ratio, molal ratio, or any other equivalent way of expressing a relative amount of silica to lime. Any suitable target time to silica weight ratio may be selected including from about 10/90 lime to silica by weight to about 40/60 lime to silica by weight. Alternatively, about 10/90 lime to silica by weight to about 20/80 lime to silica by weight, about 20/80 lime to silica by weight to about 30/70 lime to silica by weight, or about 30/70 lime to silica by weight to about 40/63 lime to silica by weight.

Other additives suitable for use in subterranean cementing operations also may be included in embodiments of the cement composition. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the cement composition after storing but prior to the placement of a cement composition into a subterranean formation. In some examples, the cement composition may further include a dispersant. Examples of suitable dispersants include, without limitation, sulfonated-formaldehyde-based dispersants (e.g., sulfonated acetone formaldehyde condensate) or polycarboxylated ether dispersants. In some examples, the dispersant may be included in the cement composition in an amount in the range of from about 0.01% to about 5% by weight of the cementitious materials. In specific examples, the dispersant may be present in an amount ranging between any of and/or including any of about 0.01%, about 0.1%, about 0.5%, about 1%, about 2%, about 3%, about 4%, or about 5% by weight of the cementitious materials.

In some examples, the cement composition may further include a set retarder. A broad variety of set retarders may be suitable for use in the cement compositions. For example, the set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. Generally, the set retarder may be present in the cement composition in an amount sufficient to delay the setting for a desired time. In some examples, the set retarder may be present in the cement composition in an amount in the range of from about 0.010% to about 10% by weight of the cementitious materials. In specific examples, the set retarder may be present in an amount ranging between any of and/or including any of about 0.01%, about 0.1%, about 1%, about 2%, about 4%, about 6%, about 8%, or about 10% by weight of the cementitious materials.

In some examples, the cement composition may further include an accelerator. A broad variety of accelerators may be suitable for use in the cement compositions. For example, the accelerator may include, but are not limited to, aluminum sulfate, alums, calcium chloride, calcium nitrate, calcium nitrite, calcium formate, calcium sulphoaluminate, calcium sulfate, gypsum-hemihydrate, sodium aluminate, sodium carbonate, sodium chloride, sodium silicate, sodium sulfate, ferric chloride, or a combination thereof. In some examples, the accelerators may be present in the cement composition in an amount in the range of from about 0.01% to about 10% by weight of the cementitious materials. In specific examples, the accelerators may be present in an amount ranging between any of and/or including any of about 0.01%, about 0.1%, about 1%, about 2%, about 4%, about 6%, about 8%, or about 10% by weight of the cementitious materials.

Cement compositions generally should have a density suitable for a particular application. By way of example, the cement composition may have a density in the range of from about 8 pounds per gallon ("ppg") (959 kg/m$^3$) to about 20 ppg (2397 kg/m$^3$), or about 8 ppg to about 12 ppg (1437. kg/m$^3$), or about 12 ppg to about 16 ppg (1917.22 kg/m$^3$), or about 16 ppg to about 20 ppg, or any ranges therebetween. Examples of the cement compositions may be foamed or unfoamed or may comprise other means to reduce their densities, such as hollow microspheres, low-density elastic beads, or other density-reducing additives known in the art.

The cement slurries disclosed herein may be used in a variety of subterranean applications, including primary and remedial cementing. The cement slurries may be introduced into a subterranean formation and allowed to set. In primary cementing applications, for example, the cement slurries may be introduced into the annular space between a conduit located in a wellbore and the walls of the wellbore (and/or a larger conduit in the wellbore), wherein the wellbore penetrates the subterranean formation. The cement slurry may be allowed to set in the annular space to form an annular sheath of hardened cement. The cement slurry may form a barrier that prevents the migration of fluids in the wellbore. The cement composition may also, for example, support the conduit in the wellbore. In remedial cementing applications, the cement compositions may be used, for example, in squeeze cementing operations or in the placement of cement plugs. By way of example, the cement compositions may be placed in a wellbore to plug an opening (e.g., a void or crack) in the formation, in a gravel pack, in the conduit, in the cement sheath, and/or between the cement sheath and the conduit (e.g., a micro annulus).

Figure 4:
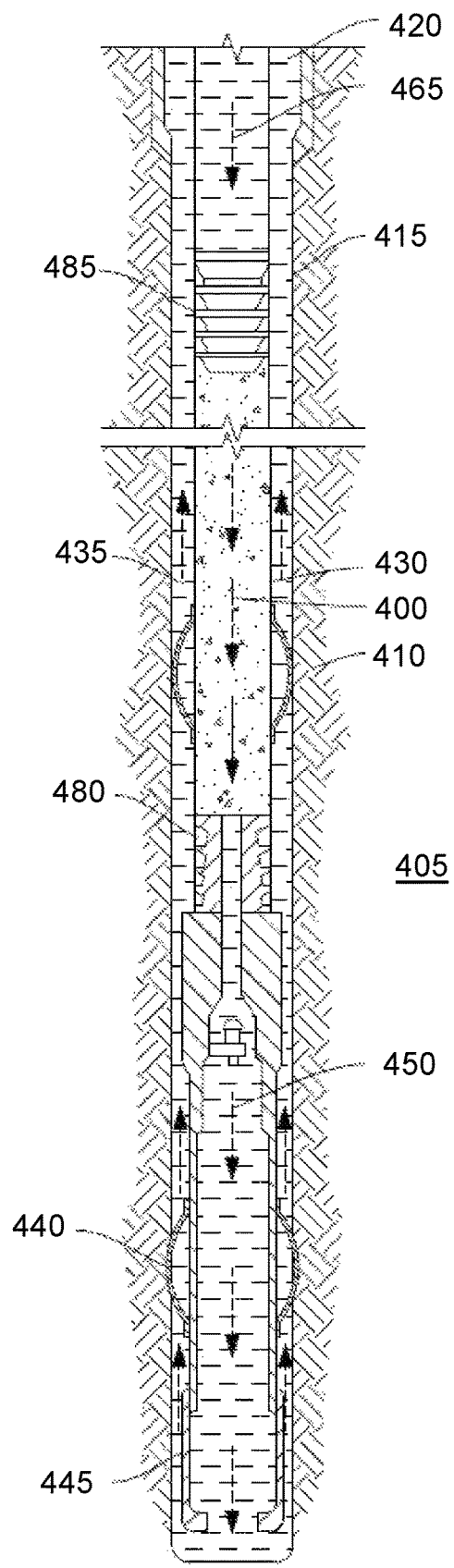
FIG. 4 is a diagram illustrating placement of a cement.

Reference is now made to FIG. 4, illustrating use of a cement slurry 400. Cement slurry 400 may comprise any of the components described herein. Cement slurry 400 may be designed, for example, using the methods to minimize carbon reduction describe herein. Cement slurry 400 may be placed into a subterranean formation 405 in accordance with example systems, methods and cement slurries. As illustrated, a wellbore 440 may be drilled into the subterranean formation 405. While wellbore 410 is shown extending generally vertically into the subterranean formation 405, the principles described herein are also applicable to wellbores that extend at an angle through the subterranean formation 405, such as horizontal and slanted wellbores. As illustrated, the wellbore 410 comprises walls 415. In the illustration, casing 430 may be cemented to the walls 415 of the wellbore 410 by cement sheath 420. In the illustration, one or more additional conduits (e.g., intermediate casing, production casing, liners, etc.), shown here as casing 430 may also be disposed in the wellbore 410. As illustrated, there is a wellbore annulus 435 formed between the casing 430 and the walls 415 of the wellbore 410. One or more centralizers 440 may be attached to the casing 430, for example, to centralize the casing 430 in the wellbore 410 prior to and during the cementing operation. The cement slurry 400 may be pumped down the interior of the casing 430. The cement slurry 400 may be allowed to flow down the interior of the casing 430 through the casing shoe 445 at the bottom of the casing 430 and up around the casing 430 into the wellbore annulus 435. The cement slurry 400 may be allowed to set in the wellbore annulus 435, for example, to form a cement sheath that supports and positions the casing 430 in the wellbore 410. While not illustrated, other techniques may also be utilized for introduction of the cement slurry 400. By way of example, reverse circulation techniques may be used that include introducing the cement slurry 400 into the subterranean formation 405 by way of the wellbore annulus 435 instead of through the casing 430. As it is introduced, the cement slurry 400 may displace other fluids 450, such as drilling fluids and/or spacer fluids that may be present in the interior of the casing 430 and/or the wellbore annulus 435. While not illustrated, at least a portion of the displaced fluids 450 may exit the wellbore annulus 435 via a flow line and be deposited, for example, in one or more retention pits. A bottom plug 455 may be introduced into the wellbore 410 ahead of the cement slurry 400, for example, to separate the cement slurry 400 from the fluids 450 that may be inside the casing 430 prior to cementing. After the bottom plug 455 reaches the landing collar 480, a diaphragm or other suitable device should rupture to allow the cement slurry 400 through the bottom plug 455. The bottom plug 455 is shown on the landing collar 480. In the illustration, a top plug 485 may be introduced into the wellbore 410 behind the cement slurry 400. The top plug 460 may separate the cement slurry 400 from a displacement fluid 465 and also push the cement slurry 400 through the bottom plug 455.

EXAMPLE

Two compositions were generated using the cement component selection process described above. The cement constraints were defined as 13 pound per gallon (ppg) density, greater than or equal to 1500 psi UCA in 72 hours at 180° F., thickening time between 90-200 mins at 160° F., less than or equal to 1000 cm$^3$ fluid loss at 160° F., and a mixability value of greater than 1.

In designing the first composition, the materials were constrained to: Portland cement, Fly Ash, Geo Polymer, and Silicalite. In designing the second composition, the materials were constrained to: Portland cement, Geo Polymer and Silicalite, but not Fly Ash. The resulting cement compositions and associated cement properties including carbon dioxide emissions, are shown in Table 6.

TABLE 6

| Material | Composition 1 (mass fraction) | Composition 2 (mass fraction) |
| --- | --- | --- |
| Portland cement | 0.25 | 0.9983 |
| Fly Ash | 0.6749 | Not used |
| Geo Polymer | 0 | 0.0017 |
| Silicalite | 0.0751 | 0 |
| Property | Value | Value |
| UCA (psi) | 2086 | 1644 |
| FL (CC) | 884 | 611 |
| TT (mins | 90 | 90 |
| Mix | 1.94 | 2.01 |
| Kg (CO2/bbl) | 44.4 | 146.7 |

It can be observed from Table 6 that the carbon dioxide content of composition 1 is much lower than the composition 2.

The following statements may describe certain embodiments of the disclosure but should be read to be limiting to any particular embodiment.

Statement 1. A method of producing a cement composition with reduced carbon emissions comprising: (a) defining cement constraints comprising at least one cement property; (b) calculating a set of cement compositions which satisfy the cement constraints, using cement property models corresponding to the cement constraints; (c) calculating a carbon emission associated with each of the cement compositions in the set of cement compositions using a carbon footprint model; (d) selecting a cement composition from the set of cement compositions; and (e) preparing the cement composition selected in step (d).

Statement 2. The method of statement 1, wherein the at least one cement property comprises a property selected from the group consisting of density, upper thickening time, lower thickening time, upper fluid loss, minimum compressive strength, minimum mixability, and combinations thereof.

Statement 3. The method of any of statements 1-2, wherein the step of calculating the set of cement compositions comprises (f) generating a cement composition by selecting at least a cement and concentration thereof, a supplementary cementitious material and a concentration thereof, a water and concentration thereof, and one or more chemical additives and concentration thereof, (g) generating a calculated cement property from the cement composition from step (f), wherein the calculated cement property corresponds to a first cement constraint from the cement constraints, wherein generating the calculated cement property comprises using a cement property model corresponding to the first cement constraint; (h) comparing the calculated cement property to the first cement constraint, and performing steps (f)-(h) if the calculated property does not meet or exceed the first cement constraint, wherein the step of generating a cement composition comprises selecting different concentrations and/or different chemical identities for the cement and/or supplementary cementitious materials and/or one or the more chemical additives than previously selected or performing step (i) if the calculated property meets or exceeds the first cement constraint; and (i) adding the generated cement composition from step (f) to the set of cement compositions.

Statement 4. The method of any of statements 1-3, wherein steps (f)-(i) are performed iteratively to generate the set of cement compositions.

Statement 5. The method of any of statements 1-4, further comprising: (j) selecting a cement composition from the set of cement compositions; (k) generating a calculated cement property from the cement composition from step (j), wherein the calculated cement property corresponds to a second cement constraint from the cement constraints, wherein generating the calculated cement property comprises using a cement property model corresponding to the second cement constraint; and (1) comparing the calculated cement property to the second cement constraint, and removing the cement composition from step (j) from the set of cement compositions if the calculated cement property does not meet or exceed the second cement constraint, or performing steps (j)-(h) if the calculated property meets or exceeds the second cement constraint.

Statement 6. The method of any of statements 1-5, further comprising: (m) repeating steps (j)-(l) for each cement constraint in the cement constraints.

Statement 7. The method of any of statements 1-6, wherein the step of calculating a carbon emission comprises: (o) selecting a cement composition from the set of cement compositions; (p) calculating a volume of slurry for a unit mass of powder of the cement composition selected in step (o) using the following equation:

$$V_{slurry} = \frac{m_{powder}}{\rho_{powder}} + \frac{\frac{\rho_{slurry}}{\rho_{powder}} - 1}{1 - \frac{\rho_{slurry}}{\rho_{water}}}{\rho_{water}}$$

where $V_{slurry}$ is volume of slurry, $m_{powder}$ is a unit mass of powder of the cement composition selected in step (o), $\rho_{powder}$ is density of the cement composition selected in step (o), $\rho_{slurry}$ is density of a slurry, and $\rho_{water}$ is density of water; (q) calculating a carbon footprint of the cement composition selected in step (o) using the following equation:

$$\text{carbon footprint} = \frac{\sum_i x_i \times CO2_i}{V_{slurry}}$$

where, $x_i$ is mass fraction of material i in the cement composition selected in step (o), and $CO2_i$ is the emission due to material i; and (r) repeating steps (o)-(q) for each cement composition in the set of cement compositions.

Statement 8. The method of any of statements 1-7, wherein selecting the cement composition from the set of cement compositions comprises selecting based at least in part on the carbon emission associated with the selected cement composition.

Statement 9. The method of any of statements 1-8, further comprising placing the cement composition prepared in step (e) in a wellbore.

Statement 10. The method of any of statements 1-9, wherein the cement is selected from the group consisting of Portland cements, pozzolana cements, gypsum cements, high alumina content cements, silica cements, and combinations thereof.

Statement 11. The method of any of statements 1-10, wherein the supplementary cementitious material is selected from the group consisting of fly ash, blast furnace slag, silica fume, pozzolans, kiln dust, clays, and combinations thereof and the chemical additive is selected from the group consisting cement set retarders, cement accelerators, and combinations thereof.

Statement 12. A method of producing a cement composition with reduced carbon emissions comprising: (a) defining cement constraints comprising at least one cement property; (b) iteratively calculating a set of cement compositions which satisfy the cement constraints, using cement property models corresponding to the cement constraints; (c) calculating a carbon emission associated with each of the cement compositions in the set of cement compositions using a carbon footprint model; (d) selecting a cement composition from the set of cement compositions; and (e) preparing the cement composition selected in step (d).

Statement 13. The method of statement 12, wherein the at least one cement property comprises at least one property selected from the group consisting of density, upper thickening time, lower thickening time, upper fluid loss, minimum compressive strength, minimum mixability, and combinations thereof.

Statement 14. The method of any of statements 12-13, wherein the step of iteratively calculating the set of cement compositions comprises: (f) generating a cement composition by selecting at least a cement and concentration thereof, a supplementary cementitious material and a concentration thereof, a water and concentration thereof, and one or more chemical additives and concentration thereof; (g) generating a first calculated cement property from the cement composition from step (f), wherein the first calculated cement property corresponds to a first cement constraint from the cement constraints, wherein generating the first calculated cement property comprises using a cement property model corresponding to the first cement constraint; (h) comparing the first calculated cement property to the first cement constraint, and performing steps (f)-(h) if the first calculated property does not meet or exceed the first cement constraint, wherein the step of generating a cement composition comprises selecting different concentrations and/or different chemical identities for the cement and/or supplementary cementitious material and/or one or the more chemical additives than previously selected in step (f) or performing step (i) if the first calculated cement property meets or exceeds the first cement constraint; (i) generating a second calculated cement property from the cement composition from step (f), wherein the second calculated cement property corresponds to a second cement constraint from the cement constraints, wherein generating the second calculated cement property comprises using a cement property model corresponding to the second cement constraint; (j) comparing the second calculated cement property to the second cement constraint, and performing steps (f)-(j) if the second calculated property does not meet or exceed second cement constraint, wherein the step of generating a cement composition comprises selecting different concentrations and/or different chemical identities for the cement and/or supplementary cementitious material and/or one or the more chemical additives than previously selected or performing step (k) if the calculated property meets or exceeds the second cement constraint; and (k) adding the generated cement composition from step (f) to the feasble set of cement compositions.

Statement 15. The method of any of statements 12-14 further comprising performing steps (f)-(k) for each cement constraint in the cement constraints.

Statement 16. The method of any of statements 12-15, wherein the step of calculating a carbon emission comprises: (o) selecting a cement composition from the set of cement compositions; (p) calculating a volume of slurry for a unit mass of powder of the cement composition selected in step (o) using the following equation:

$$V_{slurry} = \frac{m_{powder}}{\rho_{powder}} + \frac{\frac{\rho_{slurry}}{\rho_{powder}} - 1}{1 - \frac{\rho_{slurry}}{\rho_{water}}}{\rho_{water}}$$

where $V_{slurry}$ is volume of slurry, $m_{powder}$ is a unit mass of powder of the cement composition selected in step (o), $\rho_{powder}$ is density of the cement composition selected in step (o), $\rho_{slurry}$ is density of a slurry, and $\rho_{water}$ is density of water; (q) calculating a carbon footprint of the cement composition selected in step (o) using the following equation:

$$\text{carbon footprint} = \frac{\sum_i x_i \times CO2_i}{V_{slurry}}$$

where, $x_i$ is mass fraction of material i in the cement composition selected in step (o), and $CO2_i$ is the emission due to material i; and (r) repeating steps (o)-(q) for each cement composition in the set of cement compositions.

Statement 17. The method of any of statements 12-16, wherein selecting the cement composition from the set of cement compositions comprises selecting based at least in part on the carbon emission associated with the selected cement composition.

Statement 18. The method of any of statements 12-17, further comprising placing the cement composition prepared in step (e) in a wellbore.

Statement 19. The method of any of statements 12-18, wherein the cement is selected from the group consisting of Portland cements, pozzolana cements, gypsum cements, high alumina content cements, silica cements, and combinations thereof.

Statement 20. The method of any of statements 12-19, wherein the supplementary cementitious material is selected from the group consisting of fly ash, blast furnace slag, silica fume, pozzolans, kiln dust, clays, and combinations thereof and the chemical additive is selected from the group consisting cement set retarders, cement accelerators, and combinations thereof.

The disclosed cement compositions and associated methods may directly or indirectly affect any pumping systems, which representatively includes any conduits, pipelines, trucks, tubulars, and/or pipes which may be coupled to the pump and/or any pumping systems and may be used to fluidically convey the cement compositions downhole, any pumps, compressors, or motors (e.g., topside or downhole) used to drive the cement compositions into motion, any valves or related joints used to regulate the pressure or flow rate of the cement compositions, and any sensors (i.e., pressure, temperature, flow rate, etc.), gauges, and/or combinations thereof, and the like. The cement compositions may also directly or indirectly affect any mixing hoppers and retention pits and their assorted variations.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of producing a cement composition with reduced carbon emissions comprising:
   (a) defining cement constraints comprising at least one cement property;
   (b) calculating a set of cement compositions which satisfy the cement constraints, using cement property models corresponding to the cement constraints;
   (c) calculating a carbon emission associated with each of the cement compositions in the set of cement compositions using a carbon footprint model;
   (d) selecting a cement composition from the set of cement compositions; and
   (e) preparing the cement composition selected in step (d).

2. The method of claim 1, wherein the at least one cement property comprises a property selected from the group consisting of density, upper thickening time, lower thickening time, upper fluid loss, minimum compressive strength, minimum mixability, and combinations thereof.

3. The method of claim 1, wherein the step of calculating the set of cement compositions comprises:
   (f) generating a cement composition by selecting at least a cement and concentration thereof, a supplementary cementitious material and a concentration thereof, a water and concentration thereof, and one or more chemical additives and concentration thereof;
   (g) generating a calculated cement property from the cement composition from step (f), wherein the calculated cement property corresponds to a first cement constraint from the cement constraints, wherein generating the calculated cement property comprises using a cement property model corresponding to the first cement constraint;
   (h) comparing the calculated cement property to the first cement constraint, and performing steps (f)-(h) if the calculated property does not meet or exceed the first cement constraint, wherein the step of generating a cement composition comprises selecting different concentrations and/or different chemical identities for the cement and/or supplementary cementitious materials and/or one or the more chemical additives than previously selected or performing step (i) if the calculated property meets or exceeds the first cement constraint; and
   (i) adding the generated cement composition from step (f) to the set of cement compositions.

4. The method of claim 3, further comprising:
   (j) selecting a cement composition from the set of cement compositions;
   (k) generating a calculated cement property from the cement composition from step (j), wherein the calculated cement property corresponds to a second cement constraint from the cement constraints, wherein generating the calculated cement property comprises using a cement property model corresponding to the second cement constraint; and
   (l) comparing the calculated cement property to the second cement constraint, and removing the cement composition from step (j) from the set of cement compositions if the calculated cement property does not meet or exceed the second cement constraint, or performing steps (j)-(h) if the calculated property meets or exceeds the second cement constraint.

5. The method of claim 4, further comprising:
   (m) repeating steps (j)-(l) for each cement constraint in the cement constraints.

6. The method of claim 1, wherein the step of calculating a carbon emission comprises:
   (o) selecting a cement composition from the set of cement compositions;
   (p) calculating a volume of slurry for a unit mass of powder of the cement composition selected in step (o) using the following equation:

$$V_{slurry} = \frac{m_{powder}}{\rho_{powder}} + \frac{\frac{\rho_{slurry}}{\rho_{powder}} - 1}{\frac{1 - \frac{\rho_{slurry}}{\rho_{water}}}{\rho_{water}}}$$

where $V_{slurry}$ is volume of slurry, $m_{powder}$ is a unit mass of powder of the cement composition selected in step (o), $\rho_{powder}$ is density of the cement composition selected in step (o), $\rho_{slurry}$ is density of a slurry, and $\rho_{water}$ is density of water;

(q) calculating a carbon footprint of the cement composition selected in step (o) using the following equation:

$$\text{carbon footprint} = \frac{\sum_i x_i \times CO2_i}{V_{slurry}}$$

where, $x_i$ is mass fraction of material i in the cement composition selected in step (o), and $CO2_i$ is the emission due to material i; and (r) repeating steps (o)-(q) for each cement composition in the set of cement compositions.

7. The method of claim 1, wherein selecting the cement composition from the set of cement compositions comprises selecting based at least in part on the carbon emission associated with the selected cement composition.

8. The method of claim 1, further comprising placing the cement composition prepared in step (e) in a wellbore.

9. The method of claim 3, wherein the cement is selected from the group consisting of Portland cements, pozzolana cements, gypsum cements, high alumina content cements, silica cements, and combinations thereof.

10. The method of claim 3 wherein the supplementary cementitious material is selected from the group consisting of fly ash, blast furnace slag, silica fume, pozzolans, kiln dust, clays, and combinations thereof and the chemical additive is selected from the group consisting cement set retarders, cement accelerators, and combinations thereof.

11. A method of producing a cement composition with reduced carbon emissions comprising:
(a) defining cement constraints comprising at least one cement property;
(b) calculating a set of cement compositions which satisfy the cement constraints, using cement property models corresponding to the cement constraints;
(c) calculating a carbon emission associated with each of the cement compositions in the set of cement compositions using a carbon footprint model, wherein the step of calculating a carbon emission comprises:
(d) selecting a cement composition from the set of cement compositions;
(e) calculating a volume of slurry for a mass of powder of the cement composition selected in step (d) using the following equation:

$$V_{slurry} = \frac{m_{powder}}{\rho_{powder}} + \frac{\frac{\rho_{slurry}}{\rho_{powder}} - 1}{\frac{1 - \frac{\rho_{slurry}}{\rho_{water}}}{\rho_{water}}}$$

where $V_{slurry}$ is volume of slurry, $m_{powder}$ is a mass of powder of the cement composition selected in step (d), $\rho_{powder}$ is density of the cement composition selected in step (d), $\rho_{slurry}$ is density of a slurry, and $\rho_{water}$ is density of water;
(f) calculating a carbon footprint of the cement composition selected in step (d) using the following equation:

$$\text{carbon footprint} = \frac{\sum_i x_i \times CO2_i}{V_{slurry}}$$

where, $x_i$ is mass fraction of material i in the cement composition selected in step (d), and $CO2_i$ is the emission due to material i; and (g) repeating steps (d)-(f) for each cement composition in the set of cement compositions;
(h) selecting a cement composition from the set of cement compositions; and
(i) preparing the cement composition selected in step (h).

12. The method of claim 11, wherein the at least one cement property comprises a property selected from the group consisting of density, upper thickening time, lower thickening time, upper fluid loss, minimum compressive strength, minimum mixability, and combinations thereof.

13. The method of claim 11, wherein the cement property models comprise a thickening time model.

14. The method of claim 11, wherein the cement property models comprise a compressive strength model.

15. The method of claim 11, wherein the step of calculating the set of cement compositions comprises
(j) generating a cement composition by selecting at least a cement and concentration thereof, a supplementary cementitious material and a concentration thereof, a water and concentration thereof, and one or more chemical additives and concentration thereof;
(k) generating a calculated cement property from the cement composition from step (j), wherein the calculated cement property corresponds to a first cement constraint from the cement constraints, wherein generating the calculated cement property comprises using a cement property model corresponding to the first cement constraint;
(l) comparing the calculated cement property to the first cement constraint, and performing steps (j)-(l) if the calculated property does not meet or exceed the first cement constraint, wherein the step of generating a cement composition comprises selecting different concentrations and/or different chemical identities for the cement and/or supplementary cementitious materials and/or one or the more chemical additives than previously selected or performing step (m) if the calculated property meets or exceeds the first cement constraint; and
(m) adding the generated cement composition from step (j) to the set of cement compositions.

16. The method of claim 15, further comprising:
(n) selecting a cement composition from the set of cement compositions;
(o) generating a calculated cement property from the cement composition from step (n), wherein the calculated cement property corresponds to a second cement constraint from the cement constraints, wherein generating the calculated cement property comprises using a cement property model corresponding to the second cement constraint; and
(p) comparing the calculated cement property to the second cement constraint, and removing the cement composition from step (n) from the set of cement compositions if the calculated cement property does not meet or exceed the second cement constraint, or performing steps (n)-(o) if the calculated property meets or exceeds the second cement constraint.

17. The method of claim 16, further comprising:
(q) repeating steps (n)-(p) for each cement constraint in the cement constraints.

18. The method of claim 11, wherein selecting the cement composition from the set of cement compositions comprises selecting based at least in part on the carbon emission associated with the selected cement composition.

19. The method of claim 11, further comprising placing the cement composition prepared in step (i) in a wellbore.

20. The method of claim 15, wherein the cement is selected from the group consisting of Portland cements, pozzolana cements, gypsum cements, high alumina content cements, silica cements, and combinations thereof.

21. The method of claim 15 wherein the supplementary cementitious material is selected from the group consisting of fly ash, blast furnace slag, silica fume, pozzolans, kiln dust, clays, and combinations thereof and the chemical additive is selected from the group consisting cement set retarders, cement accelerators, and combinations thereof.

* * * * *